US012249285B2

(12) United States Patent
Hashikaki

(10) Patent No.: US 12,249,285 B2
(45) Date of Patent: *Mar. 11, 2025

(54) DRIVE CIRCUIT, DISPLAY DEVICE, AND DRIVE METHOD

(71) Applicant: Sony Semiconductor Solutions Corporation, Kanagawa (JP)

(72) Inventor: Kouichi Hashikaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,643

(22) Filed: Aug. 3, 2023

(65) Prior Publication Data

US 2023/0377521 A1 Nov. 23, 2023

Related U.S. Application Data

(63) Continuation of application No. 17/907,811, filed as application No. PCT/JP2021/011198 on Mar. 18, 2021, now Pat. No. 11,763,750.

(30) Foreign Application Priority Data

Mar. 27, 2020 (JP) ................................ 2020-058960

(51) Int. Cl.
*G09G 3/3258* (2016.01)
*G09G 3/20* (2006.01)
(Continued)

(52) U.S. Cl.
CPC ......... *G09G 3/3258* (2013.01); *G09G 3/2014* (2013.01); *G09G 3/3283* (2013.01);
(Continued)

(58) Field of Classification Search
CPC .. G09G 3/3258; G09G 3/2014; G09G 3/3283; G09G 3/3291; G09G 2300/0842;
(Continued)

(56) References Cited

U.S. PATENT DOCUMENTS 10,319,305 B2 * 6/2019 Kishi .................. G09G 3/3233
11,763,750 B2 * 9/2023 Hashikaki ............ G09G 3/3233 345/204
(Continued)

FOREIGN PATENT DOCUMENTS

JP H10105124 A 4/1998
JP 2001166741 A 6/2001
(Continued)

OTHER PUBLICATIONS

International Search Report (PCT/ISA/210), International Application No. PCT/JP2021/011198, dated Jun. 1, 2021.

*Primary Examiner* — Tom V Sheng
(74) *Attorney, Agent, or Firm* — Michael Best & Friedrich LLP

(57) ABSTRACT

Drive circuits and display devices with reduced power consumption are disclosed. In one example, a drive circuit includes a setting circuit configured to precharge, to a first voltage, a video signal line connected to a first transistor configured to sample a voltage of the video signal line, and an adjustment circuit configured to adjust a voltage of the video signal line by charging or discharging the video signal line precharged to the first voltage during a time period corresponding to a second voltage set in the video signal line.

11 Claims, 18 Drawing Sheets

(51) Int. Cl.
*G09G 3/3283* (2016.01)
*G09G 3/3291* (2016.01)

(52) U.S. Cl.
CPC ... *G09G 3/3291* (2013.01); *G09G 2300/0842* (2013.01); *G09G 2310/0248* (2013.01); *G09G 2310/0294* (2013.01); *G09G 2310/061* (2013.01); *G09G 2330/021* (2013.01)

(58) Field of Classification Search
CPC ..... G09G 2310/0294; G09G 2310/061; G09G 2310/0248; G09G 2330/021
USPC .......................................................... 345/204
See application file for complete search history.

(56) References Cited

U.S. PATENT DOCUMENTS

| | | | | |
|---|---|---|---|---|
| 2005/0104816 A1* | 5/2005 | Kimura | G09G 3/2022 | 345/76 |
| 2005/0259054 A1* | 11/2005 | Wu | G09G 3/3216 | 345/82 |
| 2006/0238943 A1* | 10/2006 | Awakura | G09G 3/3258 | 361/93.1 |
| 2006/0279260 A1* | 12/2006 | Tsuge | H03M 1/745 | 322/44 |
| 2007/0164935 A1* | 7/2007 | Lee | G09G 3/3283 | 345/76 |
| 2017/0047013 A1* | 2/2017 | Sun | G09G 3/3233 | |
| 2018/0211605 A1 | 7/2018 | Kim | | |
| 2019/0251900 A1* | 8/2019 | Min | G09G 3/3275 | |
| 2019/0279562 A1 | 9/2019 | Oulee | | |
| 2020/0226979 A1* | 7/2020 | Koshihara | G09G 3/3233 | |
| 2021/0358413 A1* | 11/2021 | Chen | G09G 3/3233 | |

FOREIGN PATENT DOCUMENTS

| | | |
|---|---|---|
| JP | 2003241717 A | 8/2003 |
| JP | 2006146158 A | 6/2006 |
| JP | 2007079545 A | 3/2007 |
| JP | 2013076812 A | 4/2013 |

* cited by examiner $$Vout = VPCHG - \frac{Iout \times tPWM}{Cpix}$$

$$Vout = VPCHG + \frac{Iout \times tPWM}{Cpix}$$

DRIVE CIRCUIT, DISPLAY DEVICE, AND DRIVE METHOD

CROSS REFERENCE TO RELATED APPLICATIONS

This is a Continuation Application of U.S. patent application Ser. No. 17/907,811, filed Aug. 29, 2022, which is a 371 National Stage Entry of International Application No.: PCT/JP2021/011198, filed on Mar. 18, 2021, which in turn claims priority from Japanese Priority Patent Application JP 2020-058960 filed on Mar. 27, 2020, the entire contents of which are incorporated herein by reference.

TECHNICAL FIELD

The present disclosure relates to a drive circuit, a display device, and a drive method.

BACKGROUND ART

A display device represented by a micro-display such as an organic EL includes a pixel array that displays an image by a plurality of pixels, a horizontal drive circuit that writes a video signal to each pixel of the pixel array, a vertical drive circuit that selects a video signal line to which the video signal is written, a horizontal logic circuit configured to control the horizontal drive circuit, and a vertical logic circuit configured to control the vertical drive circuit. The display device further includes an interface that converts an input signal to the display device into a logic level output signal, and a controller that controls operation timing of the vertical drive circuit and the horizontal drive circuit on the basis of the output signal converted by the interface.

Patent Document 1 below discloses a driving example of a pixel that improves image quality by constant current PWM driving. In the technique disclosed in the document, first, a voltage according to an input signal voltage is held at a gate of a switching control transistor in a pixel, and then a bias voltage is held at a gate of a driver transistor of an organic EL. Thereafter, a ramp (RAMP) wave is applied to the node via capacitor. The circuit applies a constant current to the organic EL light emitting element until the voltage of the node increases in response to the application of the ramp wave and the voltage of the node reaches the threshold voltage of the switching control transistor. Since the pixel requires a RAMP wave for PWM control of the organic EL light emitting element, there are problems of increase in power consumption, lateral shading, and deterioration of lateral crosstalk.

CITATION LIST

Patent Document

Patent Document 1: JP 2013-76812

SUMMARY OF THE INVENTION

Problems to be Solved by the Invention

The present disclosure provides a drive circuit, a display device, and a drive method for reducing power consumption.

Solution to Problems

A drive circuit of the present disclosure includes a setting circuit configured to precharge, to a first voltage, a video signal line connected to a first transistor configured to sample a voltage of the video signal line, and an adjustment circuit configured to adjust a voltage of the video signal line by charging or discharging the video signal line precharged to the first voltage during a time period corresponding to a second voltage set in the video signal line.

The setting circuit may include a first switch that connects the video signal line to the first voltage, and the adjustment circuit includes a current source that includes a second transistor and a second switch that connects the video signal line and the current source.

The drive circuit may include a detection circuit that includes a first terminal connected to the second voltage and a second terminal connected to the video signal line, and is configured to detect a difference between the second voltage and a voltage of the video signal line, and a holding circuit configured to hold a voltage according to the difference and supply the voltage to a control terminal of the current source.

The detection circuit may include an amplifier configured to generate a current according to a difference between the second voltage and a voltage of the video signal line, and the holding circuit includes a capacitor configured to accumulate a charge according to the current.

The drive circuit includes a third switch that connects the first terminal and the second terminal, and the adjustment circuit turns on the third switch for a certain period before an operation of the amplifier.

The detection circuit may include a comparator configured to detect timing at which a voltage of the video signal line is the second voltage, a phase comparator configured to detect a difference between the timing and timing according to the second voltage, and a charge pump configured to generate a current according to the difference, and the holding circuit may include a capacitor configured to accumulate a charge according to the current.

The detection circuit may include a conversion circuit configured to convert the difference between the second voltage and a voltage of the video signal line into a digital signal, and the holding circuit may include a digital to analog converter configured to supply a voltage according to the digital signal to the control terminal.

The first voltage may be a voltage corresponding to a maximum gradation or a minimum gradation.

The second voltage may be a voltage corresponding to a gradation that a pixel circuit including the first transistor is caused to display.

The second voltage may include an offset voltage for correcting a threshold voltage of a second transistor for driving a light emitting element in a pixel circuit including the first transistor.

The drive circuit may include a scanning circuit configured to turn on the first transistor and supply a voltage of the video signal line set to the offset voltage to a node in the pixel circuit, the setting circuit may precharge the video signal line to the first voltage after the offset voltage is supplied to the pixel circuit, the adjustment circuit may adjust the video signal line to a voltage corresponding to the gradation by charging or discharging the video signal line precharged to the first voltage during a time period according to a voltage corresponding to a gradation, and the scanning circuit may turn on the first transistor to supply a voltage of the video signal line to a node in the pixel circuit.

The drive circuit may include a plurality of sub-drive circuits each including the setting circuit and the adjustment circuit, and a current generation circuit configured to generate a reference current, the plurality of sub-drive circuits may be connected to a plurality of the video signal lines, the adjustment circuit of each of the plurality of sub-drive circuits may include a third transistor configured to sample a reference current, and the adjustment circuit of each of the plurality of sub-drive circuits may charge or discharge the video signal line precharged by the setting circuit with a current sampled by the third transistor.

The current generation circuit may include a first capacitor connected to a third voltage, a current source that includes a fourth transistor, a fourth switch that connects the first capacitor and the current source, a fifth switch connecting both ends of the first capacitor, a detection circuit that includes a first terminal connected to a fourth voltage and a second terminal connected to the fourth switch, the detection circuit being configured to detect a difference between a voltage of the first terminal and a voltage of the second terminal, a holding circuit configured to hold a voltage according to the difference and supply the voltage to a control terminal of the current source, a sixth switch that diode-connects the third transistor of each of the plurality of sub-drive circuits, and a seventh switch that connects the diode-connected third transistor of each of the plurality of sub-drive circuits and the current source.

The fourth switch and the fifth switch may be turned on to precharge the first capacitor, the fifth switch may be turned off to discharge the first capacitor to generate the reference current, the fourth switch may be turned off to operate the detection circuit for a certain period, and the sixth switch and the seventh switch may be turned on to sample the reference current in the sub-drive circuit.

During a period during which the first transistor is turned off, the setting circuit may precharge the video signal line to the first voltage and the adjustment circuit may adjust the video signal line to the second voltage.

A period during which the first transistor is turned off may include a blanking period that includes a period during which a pixel circuit including the first transistor does not emit light.

A display device of the present disclosure includes a video signal line configured to supply a video signal, a pixel circuit including a first transistor connected to the video signal line, the first transistor being configured to sample a voltage of the video signal line, a drive circuit including a setting circuit configured to precharge the video signal line to a first voltage and an adjustment circuit configured to adjust a voltage of the video signal line by charging or discharging the video signal line precharged to the first voltage during a time period corresponding to a second voltage set in the video signal line, and a scanning circuit configured to control on and off of the first transistor.

A drive method of the present disclosure includes precharging, to a first voltage, a video signal line connected to a first transistor configured to sample a voltage of the video signal line, and adjusting a voltage of the video signal line by charging or discharging the video signal line precharged to the first voltage during a time period corresponding to a second voltage set in the video signal line.

MODE FOR CARRYING OUT THE INVENTION

Hereinafter, embodiments of the present disclosure will be described with reference to the drawings. In one or more embodiments shown in the present disclosure, the elements included in each embodiment can be combined with each other, and the combined result also forms part of the embodiments shown in the present disclosure.

First, the technical background of the embodiment of the present disclosure will be described.

Figure 19:
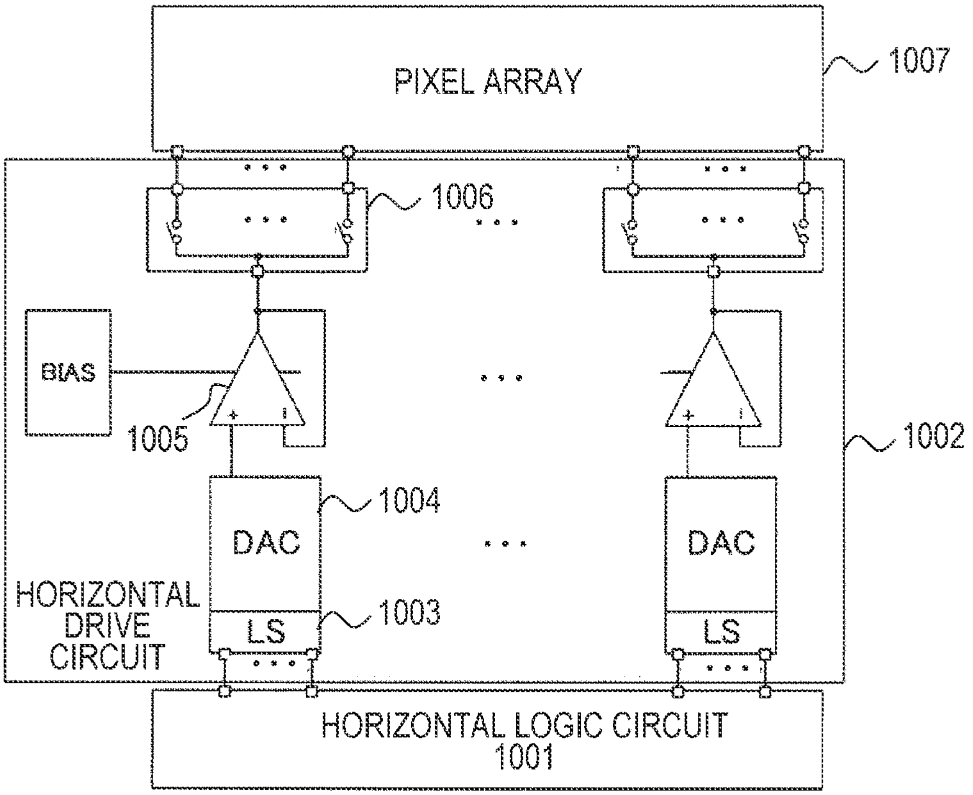
FIG. 19 schematically illustrates a configuration of a voltage follower drive system as a horizontal drive circuit in an active matrix-type display device.

FIG. 19 schematically illustrates a configuration of a voltage follower drive system as a horizontal drive circuit in an active matrix-type display device. A horizontal drive circuit 1002 receives a data signal for a pixel circuit (hereinafter, a pixel) from a horizontal logic circuit 1001, and corrects the data signal to a voltage according to a gamma characteristic by a level shifter (LS) 1003. The corrected voltage is converted into an analog signal by a digital to analog converter (DAC) circuit 1004. The analog signal is subjected to impedance conversion by an operational amplifier (buffer amplifier) 1005 to which a predetermined bias voltage is applied. The voltage of the signal after the impedance conversion is applied to the video signal line (pixel signal line) of the pixel column selected by an output selector (demultiplexer) 1006 in a pixel array 1007. Among the selected pixel columns, pixels to which signals are to be written are selected by a vertical drive circuit (not illustrated).

In the voltage follower system of FIG. 19, the horizontal drive circuit 1002 includes one horizontal drive circuit (LS, DAC, operational amplifier, output selector) corresponding to a plurality of pixel columns, and performs time-division control on the output selector 1006 to suppress an increase in power consumption and a circuit area. In this system, since the voltage follower buffers the voltage to drive the pixel, there is an advantage that image quality degradation is relatively less likely to occur in the case of high definition. However, as the definition is higher, the number of channels (the number of pixel columns) increases, and the DC bias power of the voltage follower of each pixel column (channel) increases.

A video signal writing method using a method called a RAMPDAC method is also known instead of the voltage follower method in FIG. 19.

Figure 20:
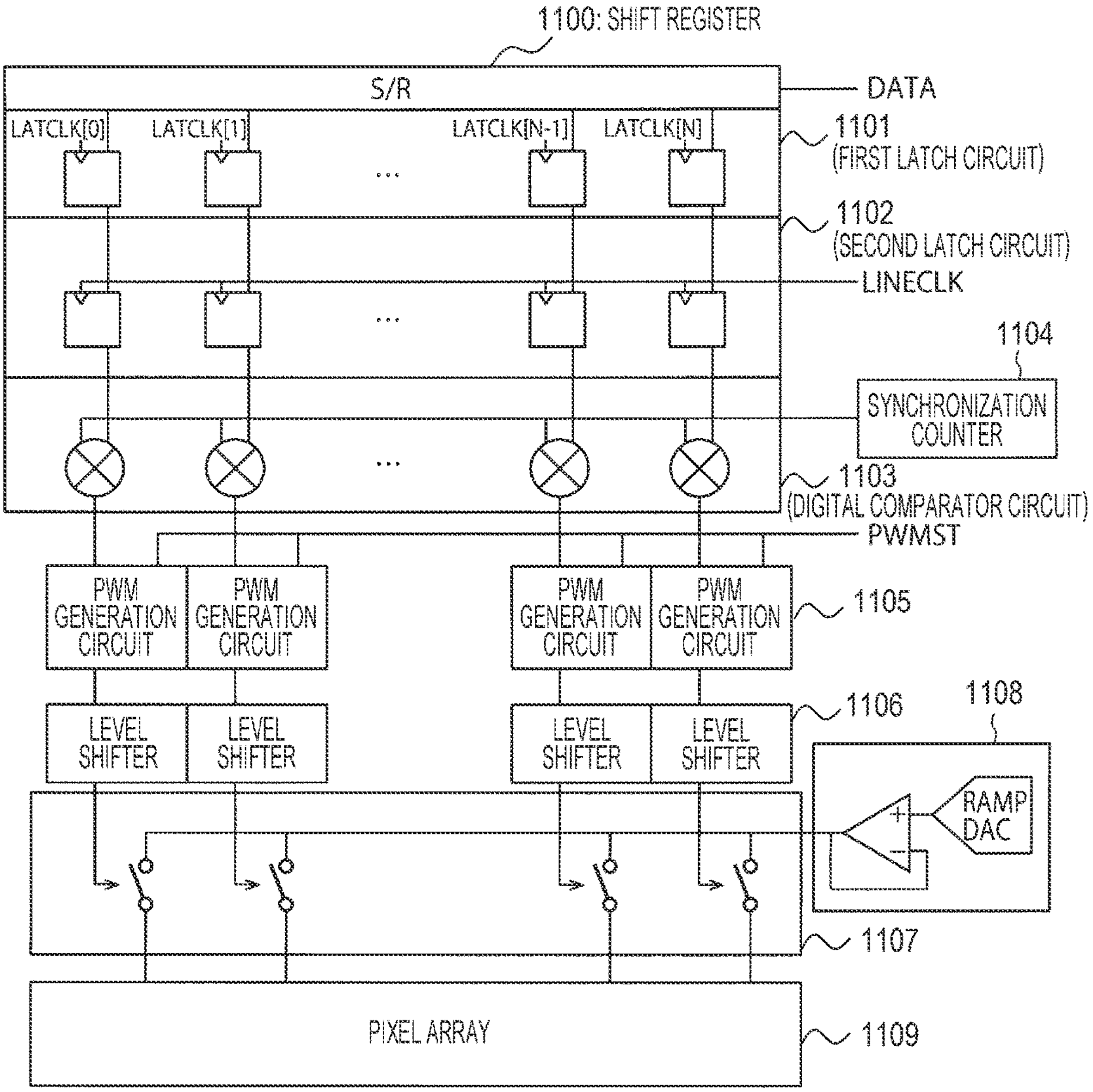
FIG. 20 is a diagram schematically illustrating configurations of a horizontal logic circuit and a horizontal drive circuit using the RAMPDAC method.

FIG. 20 schematically illustrates configurations of a horizontal logic circuit and a horizontal drive circuit using the RAMPDAC method in an active matrix type display device. The horizontal logic circuit includes a shift register 1100, a first latch circuit 1101, and a second latch circuit 1102. The horizontal drive circuit includes a digital comparator 1103, a synchronization counter 1104, a PWM generation circuit 1105, a level shifter 1106, a switch circuit 1107, and a ramp circuit 1108 (analog buffer, RAMPDAC).

The N+1 latches in the first latch circuit 1101 sample and latch the data signal (digital gradation data) corresponding to each pixel at timing when the clocks LATCK [0] to LATCK [N] are input from the shift register 1100 to the CLK terminal.

The N+1 latches included in the second latch circuit 1102 read and latch the signals held in the N+1 latches in the first latch circuit at timing when a common line clock (LINECLK) is input to the CLK terminal. The latched data signals are input to N+1 comparators in the digital comparator 1103.

The synchronization counter 1104 is reset at timing when LINECLK is input to the second latch circuit, and starts counting a gradation clock provided from the outside. The synchronization counter 1104 counts a gradation clock generated during one horizontal scanning period to output the counted value to each comparator.

The PWM generation circuits 1105 are provided corresponding to respective digital comparators 1103. Each PWM generation circuit 1105 outputs a voltage at a predetermined level as a PWM signal during a time period until the data signal (corresponding to the gradation value) input to a comparator matches the counted value input to the comparator.

Therefore, from each PWM generation circuit 1105, a rectangular wave having a length according to the gradation value indicated by the corresponding data signal is output as a PWM signal.

The level shifters 1106 correspond to the respective PWM generation circuits 1105, adjusts the length of the rectangular wave (PWM signal) output from PWM generation circuit 1105 according to the gamma characteristic to output the adjusted PWM signal.

The ramp circuit 1108 includes a RAMPDAC configured to generate a ramp wave that is a wave of a voltage in which voltage changes (rises or falls) at a constant rate from an initial voltage within one horizontal scanning period, and an analog buffer that buffers the ramp wave. The ramp circuit 1108 outputs a ramp wave in accordance with the start timing of the output of each level shifter 1106 (or the output of the PWM generation circuit) via the analog buffer.

Switches in the switch circuit 1107 correspond to the respective level shifters 1106. Each switch is turned on while the PWM signal (rectangular wave) output from each level shifter 1106 is input to output a ramp wave while being turned on. When the PWM signal is not input, each switch is turned off to stop the output of the ramp wave. As a result, a voltage according to the length of the PWM signal is output to the pixel array 1109 as a voltage (gradation voltage) representing the corresponding gradation value. The pixel array 1109 drives a corresponding pixel using a current according to the gradation voltage via each switch.

The RAMPDAC method of FIG. 20 requires fewer analog circuits than the voltage follower method of FIG. 19, and thus has low power consumption and a configuration suitable for miniaturization. However, the load capacitor of all the pixels is the load of the analog buffer, and an operation of writing a transiently changing waveform like a ramp wave is performed. Therefore, during writing to the pixel, a current according to the load capacitor of the pixel and the slope of the ramp wave is generated. This current causes image quality problems such as lateral shading, lateral crosstalk, and switching noise depending on the resistance of the wiring at the time of writing the voltage of the RAMP waveform. This problem is particularly noticeable in a case where the resolution is increased.

The present disclosure solves a problem of a large DC bias power and a problem of image quality degradation associated with high definition of a display device.

First Embodiment

Figure 1:
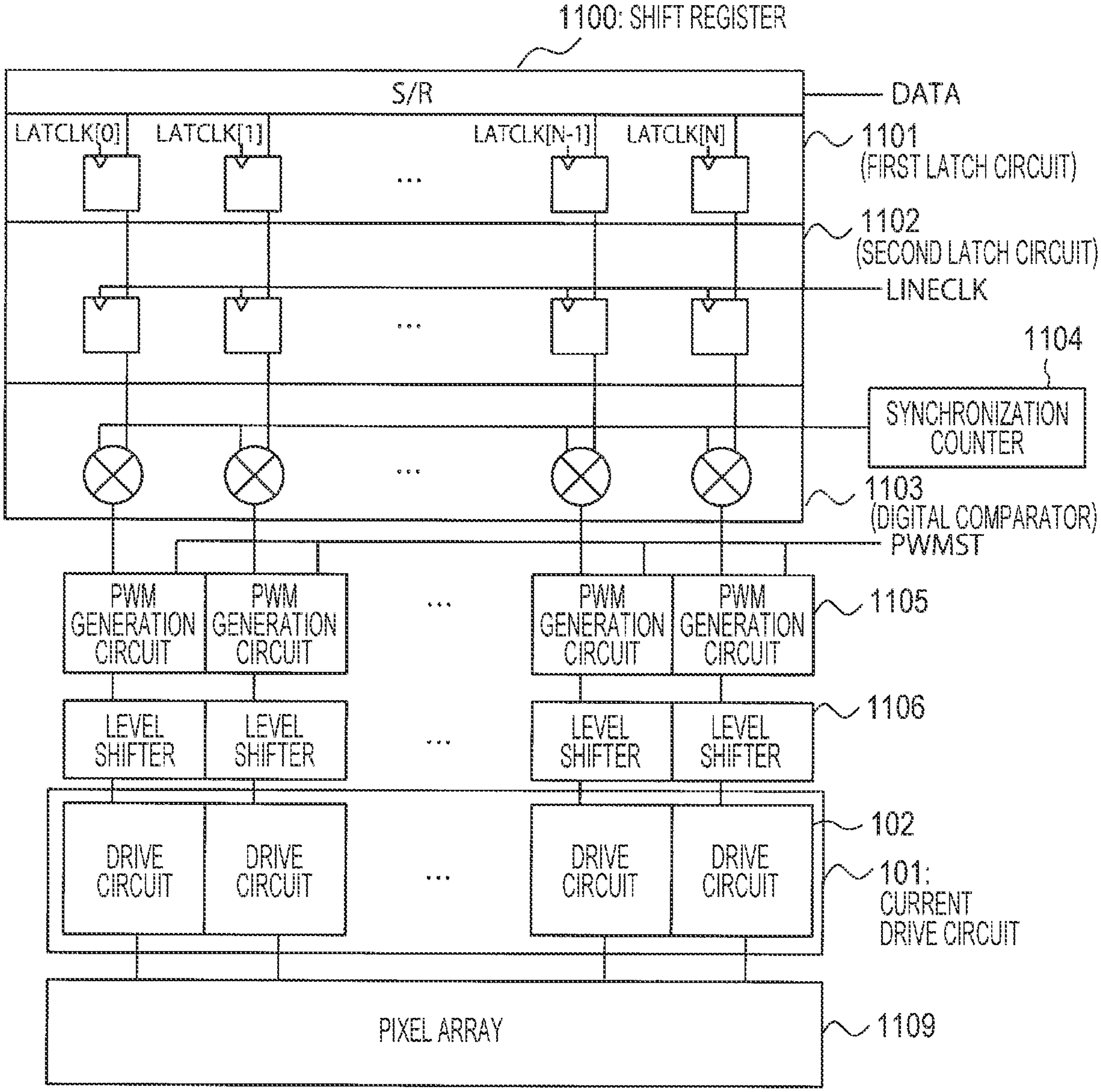
FIG. 1 is a diagram schematically illustrating a configuration example of a horizontal drive circuit and a pixel array in a display device according to a first embodiment of the present disclosure.

FIG. 1 is a block diagram illustrating a horizontal drive circuit and a pixel array in an active matrix-type display device according to a first embodiment of the present disclosure. The horizontal drive circuit includes a shift register 1100, a first latch circuit 1101, a second latch circuit 1102, a synchronization counter 1104, a digital comparator 1103, a PWM generation circuit 1105, a level shifter 1106, and a current drive circuit 101. The blocks 1100 to 1106 have a configuration similar to that of FIG. 20. The current drive circuit 101 includes a drive circuit 102 corresponding to each pixel column. As described above, by the processing of the blocks 1100 to 1106, a voltage (PWM signal) having a time width according to the data signal (gradation) is generated for each pixel and supplied to the drive circuit 102 corresponding to each pixel column. The drive circuit 102 is connected to a video signal line (pixel signal line) corresponding to each pixel column. The drive circuit 102 generates a voltage (gradation voltage) according to the PWM signal, and supplies the voltage to the pixel connected to the video signal line as a signal voltage of the video signal. One of the features of the present embodiment is to generate a signal voltage with low power consumption and high accuracy by the drive circuit 102.

Figure 2:
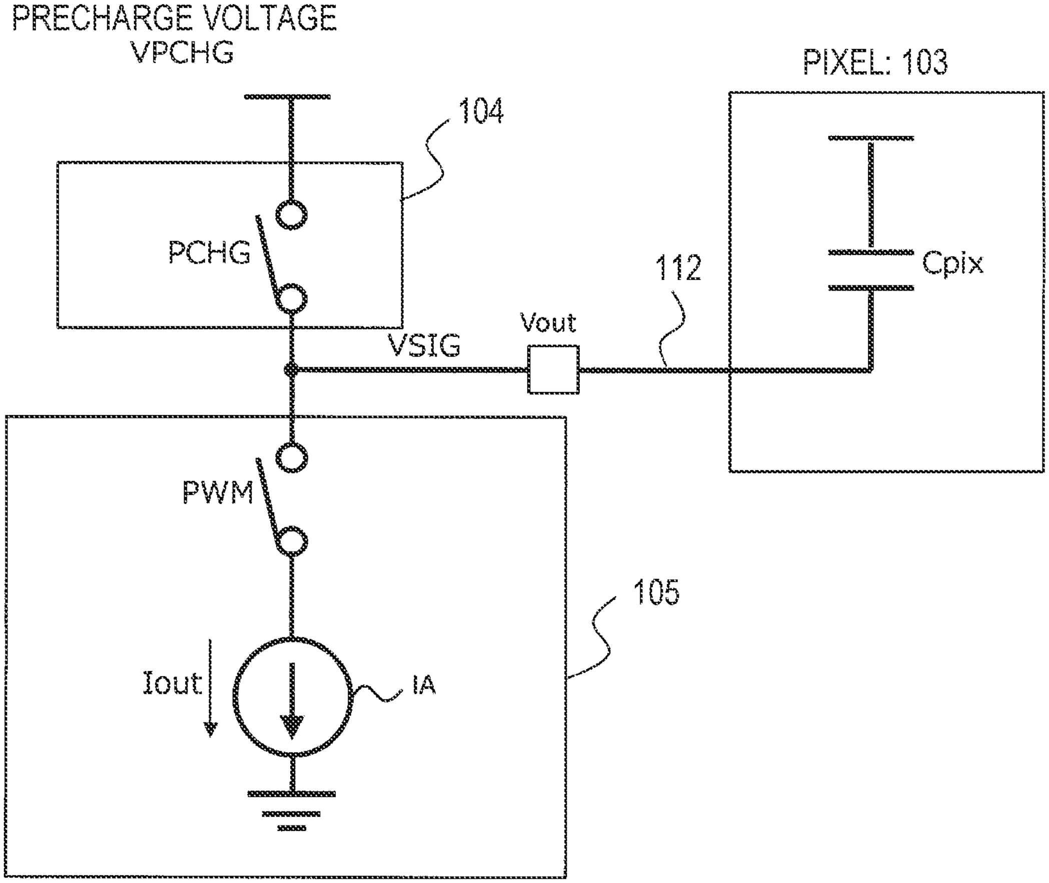
FIG. 2 is a diagram showing a drive circuit and a pixel in a horizontal drive circuit.

FIG. 2 is a diagram illustrating part of the configuration of the drive circuit 102 according to the present embodiment and one pixel 103.

The drive circuit 102 includes a setting circuit 104, an adjustment circuit 105, and an output terminal Vout. The voltage of the output terminal Vout is represented by the reference numeral Vout same as the output terminal. The setting circuit 104 includes a switch PCHG (first switch). The adjustment circuit 105 includes an output current source IA and a switch PWM (second switch). The output current source IA is an NMOS transistor. The output terminal Vout is connected to a video signal line 112. A pixel 103 is connected to the video signal line 112. From the perspective of the drive circuit 102, the pixel 103 appears equivalently as a capacitor. Specifically, the capacitor is a capacitor of a wiring (video signal line) from the drive circuit 102 to the pixel, a parasitic capacitor of a sampling transistor included in the pixel 103, or the like. The sampling transistor is connected to the video signal line 112, and samples the signal voltage of the video signal. This capacitor is represented as Cpix. The capacitor Cpix is referred to as a pixel load capacitor. The pixel load capacitor Cpix will be described more specifically.

Figure 3:
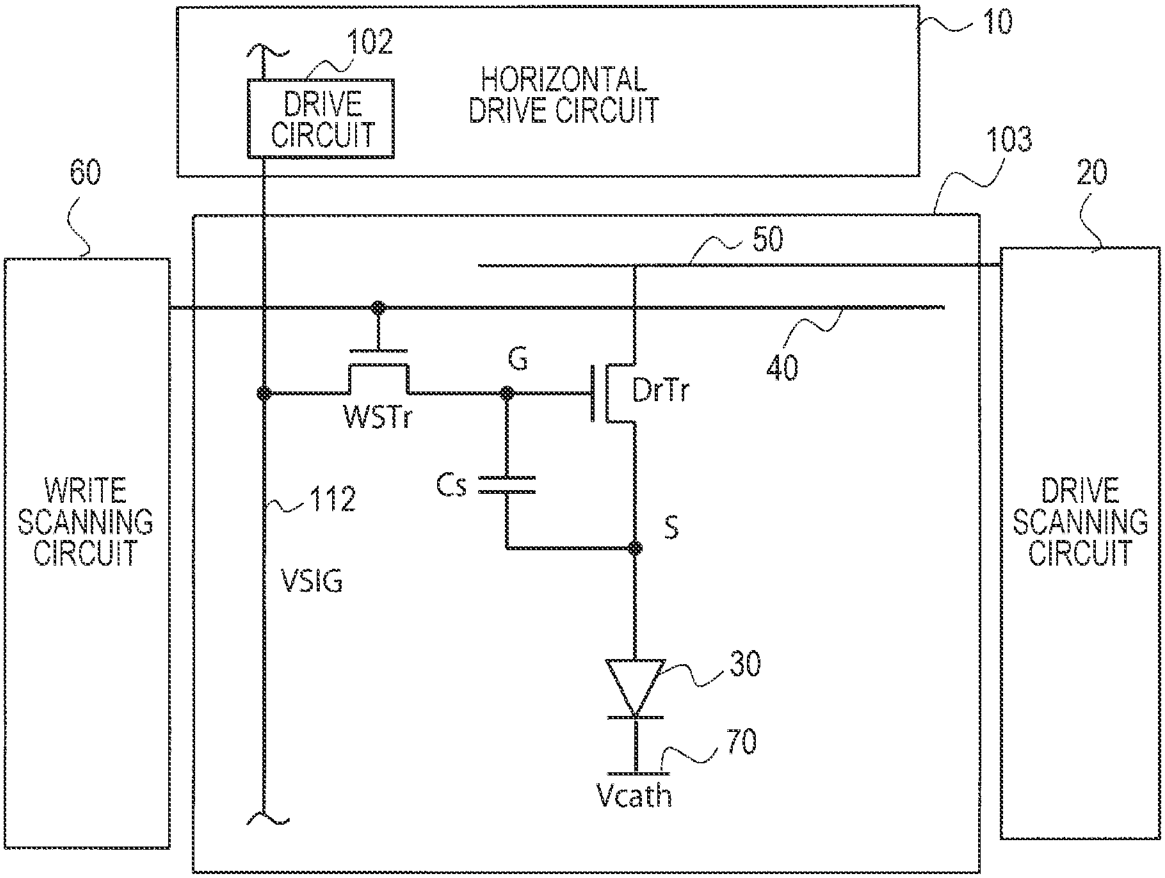
FIG. 3 is a block diagram illustrating a configuration of a pixel and its peripheral circuit.

FIG. 3 is a block diagram illustrating a configuration of the pixel 103 and its peripheral circuit in the active matrix-type display device according to the present embodiment. Although one pixel 103 is illustrated in FIG. 3, pixels are actually disposed in a matrix in the pixel array. The peripheral circuit includes a horizontal drive circuit 10, a drive scanning circuit 20, and a write scanning circuit 60. The drive scanning circuit 20 and the write scanning circuit 60 correspond to a vertical drive circuit. The configuration of the pixel 103 is an example, and various other configurations can be provided. A drive circuit 102 is provided for each column of pixels.

The pixel 103 includes a sampling transistor WSTr, a drive transistor DrTr, a capacitor Cs, and a light emitting element 30. Each transistor is assumed to be an NMOS transistor, but may be a PMOS transistor, or transistors of both conductivity types may be mixed. The light emitting element 30 is a two-terminal type organic EL light emitting element including an anode and a cathode. However, the light emitting element 30 is not limited to the organic EL light emitting element, and generally includes any device that emits light by current drive.

The drive transistor DrTr has a gate connected to the node G, a source connected to the node S, and a drain connected to a drive line 50. The light emitting element 30 has an anode connected to the node S, and a cathode connected to a common power supply line 70 (having a voltage Vcath) wired in common for all the pixels. The sampling transistor WSTr is connected between the video signal line 112 and the node G. The gate of the sampling transistor WSTr is connected to a scanning line 40. The capacitor Cs is connected between the node G and the node S. While the drive line 50 is set to a predetermined potential by the drive scanning circuit 20 and the drive line 50 is set to the predetermined potential, the following operation is performed. First, the sampling transistor WSTr is turned on for a certain period of time by the write scanning circuit 60. The signal voltage of the video signal line 112 is written into the capacitor Cs via the node G, and the capacitor Cs is set to the signal potential. The drive transistor DrTr causes a current to flow between the drain and the source according to a gate voltage applied between the gate and the source via the capacitor Cs, and drives the light emitting element 30 by the current.

The pixel load capacitor Cpix described with reference to FIG. 2 includes a wiring capacitor present in such a video signal line 112, a parasitic capacitor present on the input side of the sampling transistor WStr, and the like.

The output current source IA of FIG. 2 is connected to the ground voltage and the switch PWM. The output terminal Vout is connected to the video signal line 112. The switch PWM connects the output current source IA and the video signal line 112 via the output terminal Vout. The switch PCHG connects the precharge voltage VPCHG (first voltage) and the video signal line 112 via the output terminal Vout. The setting circuit 104 turns on the PCHG 104 and precharges the video signal line 112 to the precharge voltage VPCHG. The PCHG 104 is turned off, and the switch PWM is turned on for the time length of the PWM signal supplied from the level shifter. The PWM signal is a rectangular voltage waveform having a time width according to a gradation. That is, the switch PWM is turned on during a time period according to the second voltage that is a desired voltage to be set in the video signal line. Consequently, the precharged video signal line 112 is charged or discharged (that is, the capacitor Cpix is charged or discharged). Consequently, the voltage of video signal line 112 is adjusted to a desired voltage, for example, a voltage corresponding to the gradation indicated by the PWM signal. After the adjustment, the signal voltage is written into the pixel 103 when write scanning circuit 60 turns on the sampling transistor WSTr of the pixel 103 via the scanning line 40.

Figure 4:
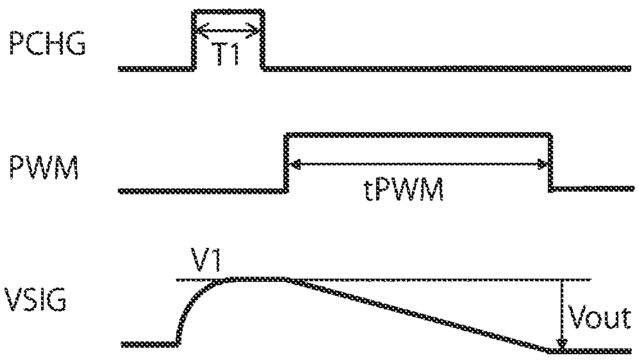
FIG. 4 is a diagram illustrating a timing chart of the drive circuit of FIG. 2.

FIG. 4 illustrates a timing chart of the drive circuit 102 of FIG. 2. The timing chart illustrates an example of an operation of generating a voltage (second voltage) according to the PWM signal supplied from the level shifter by the drive circuit 102 and setting the generated voltage as a signal voltage in the video signal line 112. The horizontal axis represents time. The operation of FIG. 4 is performed during a period during which the sampling transistor is turned off. The operation of FIG. 4 may be performed, for example, in a blanking period in which all pixels are in a non-light emitting period.

In FIG. 2, first, the switch PCHG is turned on, and the video signal line 112 is precharged to the precharge voltage VPCHG for a certain period T1. That is, the pixel load capacitor Cpix is precharged to the precharge voltage VPCHG. The voltage VSIG of the video signal line 112 is the precharge voltage VPCHG (=V1). Next, the switch PCHG is turned off, and the switch PWM is turned on for a time tPWM according to the PWM signal (gradation value). As a result, the precharged video signal line 112 is charged or discharged by the output current source IA. The waveform of the voltage VSIG of the video signal line is dropped from the precharge voltage V1 with the slope of the output current Tout/pixel load capacitor Cpix (value obtained by dividing the output current Iout by the pixel load capacitor Cpix). After the time tPWM, the switch PWM is turned off. The voltage VSIG of the video signal line 112 at this time is the output voltage Vout. The output voltage Vout can be used as a signal voltage according to a gradation. The output voltage Vout is defined by the following Expression.

$$Vout=VPCHG-(Iout\times tPWM/Cpix) \qquad \text{Expression (A).}$$

As described above, the signal voltage according to the gradation can be generated by turning on the switch PWM for the time length of the PWM signal. Thereafter, by turning on the sampling transistor of the pixel 103 connected to the video signal line 112, the signal voltage is written into the pixel 103. Here, as an example, the precharge voltage VPCHG is a voltage corresponding to the minimum width of the PWM signal (a voltage corresponding to the maximum gradation or the minimum gradation). The current source IA is adjusted such that when the switch PCHG is turned on for a time period corresponding to the maximum width of the PWM signal, the precharged video signal line (capacitor Cpix) flows a current that reaches a voltage corresponding to the maximum width of the PWM signal. Note that the voltage corresponding to the maximum gradation may be expressed as VG255, and the voltage corresponding to the minimum gradation may be expressed as VG0.

By charging or discharging the video signal line precharged to a predetermined precharge voltage for a time length according to the PWM signal in such a manner, a voltage according to a gradation can be accurately set to the video signal line. In addition, the circuit that performs the analog operation in the drive circuit of FIG. 2 includes only the output current source IA, the circuit configured to generate and buffers the RAMP waveform is unnecessary, and the power consumption is low.

FIGS. 2 and 4 illustrate the configuration and the operation in the case where the output current source is an NMOS transistor (in the case of N-channel drive), but the configuration in which the output current source is a PMOS transistor (in the case of P-channel drive) can be similarly provided.

Figure 5:
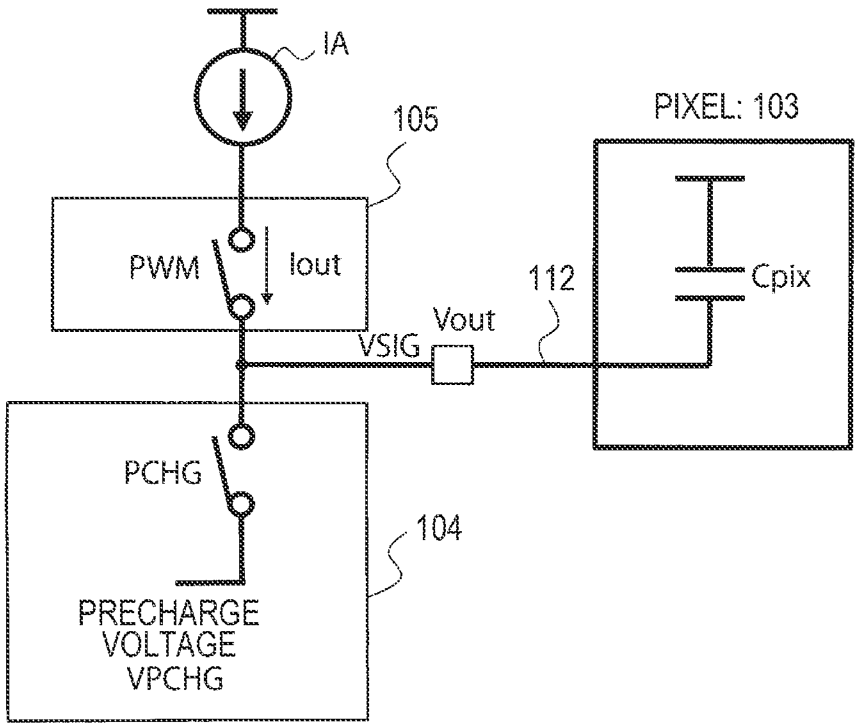
FIG. 5 is a diagram illustrating an example of a drive circuit in a case where an output current source is a PMOS transistor.

FIG. 5 illustrates an example of the drive circuit 102 in a case where the output current source IA is a PMOS transistor.

Figure 6:
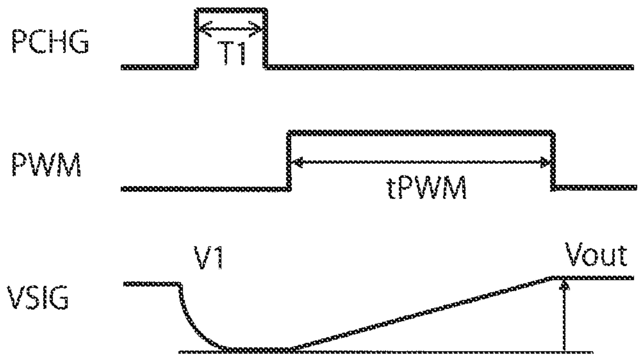
FIG. 6 is a timing chart of the drive circuit of FIG. 5.

FIG. 6 illustrates a timing chart of the drive circuit of FIG. 5. In this configuration, the output voltage Vout is defined by the following Expression.

$$Vout=VPCHG+(Iout\times tPWM/Cpix) \quad \text{Expression (B).}$$

Since the description of FIGS. 5 and 6 is similar to the description of FIGS. 2 and 4, the description thereof will be omitted.

Figure 7:
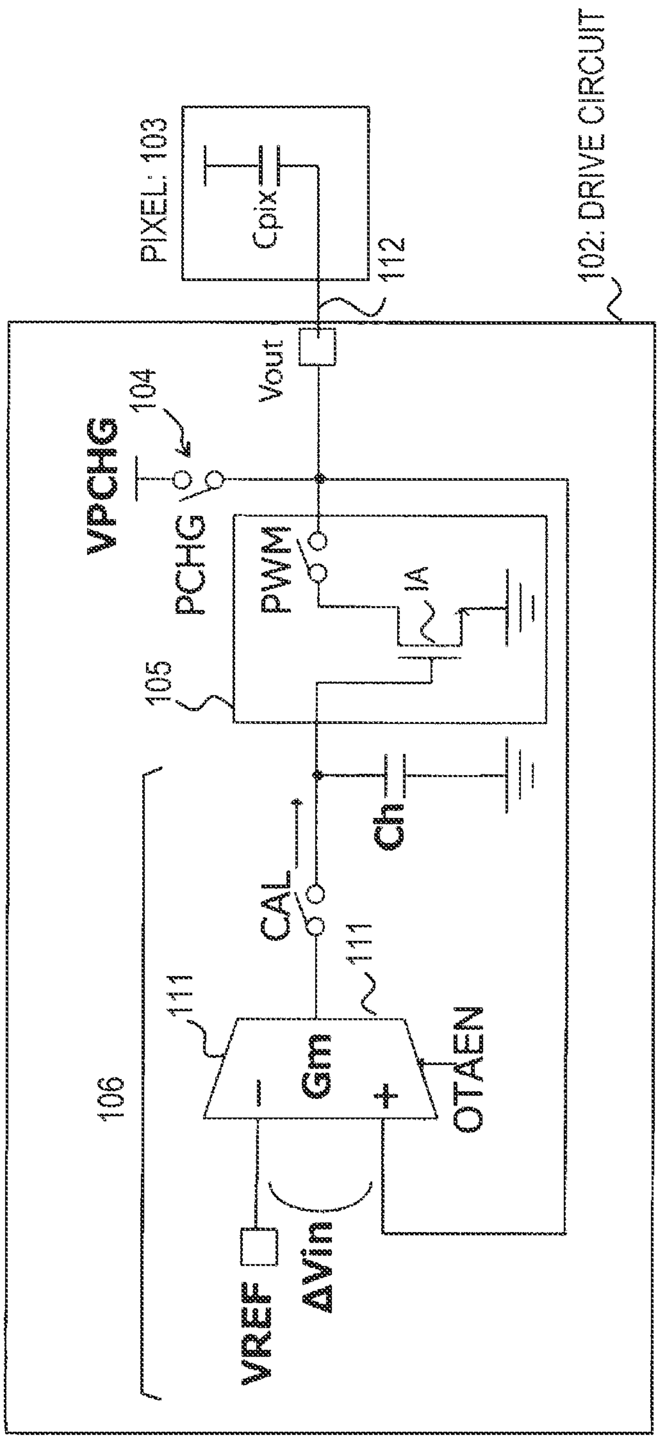
FIG. 7 is a block diagram illustrating another configuration example of the drive circuit.

FIG. 7 is a block diagram illustrating an example of another configuration of the drive circuit 102. A current correction circuit 106 is added to the drive circuit 102 of FIG. 2. The current correction circuit 106 includes a voltage control current source circuit (OTA) 111, a switch CAL, a hold capacitor Ch, and a reference terminal VREF. The output current source IA is configured by an NMOS transistor in this example. The current correction circuit 106 has an effect of reducing a current relative variation error between the output current sources IA of the drive circuits corresponding to respective pixel columns.

The OTA 111 has a −input terminal (first terminal), a +input terminal (second terminal), and an enable terminal. The OTA 111 operates while the OTAEN signal input to the enable terminal is turned on. A voltage (desired voltage) desired to be set in the video signal line is supplied as a reference voltage VREF to the −input terminal of the OTA 111. As an example, a voltage corresponding to the gradation represented by the PWM signal is supplied. In a case where the gradation represented by the PWM signal is the maximum gradation, the reference voltage VREF is a voltage (VG255) corresponding to the maximum gradation. The +input terminal is connected to the output terminal Vout, and the output voltage Vout (voltage of Cpix) is supplied thereto. The OTA 111 is an example of a detection circuit configured to detect a difference between a voltage supplied to the −input terminal and a voltage supplied to the +input terminal. The OTA 111 generates a current according to the detected difference. More specifically, the OTA 111 calculates a difference ΔVin between the reference voltage VREF and the output voltage Vout, and changes the output current by a current obtained by multiplying the difference ΔVin by the transconductance Gm.

The switch CAL connects the output of the OTA 111 and one end of the hold capacitor Ch. The other end of the hold capacitor Ch is connected to the ground voltage. One end of the hold capacitor Ch is connected to a control terminal (gate) of an NMOS transistor which is the current source IA. The hold capacitor Ch is an example of a holding circuit that holds a voltage according to the difference and supplies the held voltage to the control terminal of the output current source IA.

The hold capacitor Ch is charged or discharged via the switch CAL by the current generated by the OTA 111. That is, a charge according to the current is accumulated in the hold capacitor Ch. As a result, the voltage of the hold capacitor Ch is adjusted. The voltage of the hold capacitor Ch is supplied to the gate of an NOS transistor. The hold capacitor Ch has a role of holding a gate voltage of the output current source IA. The range of the output current of the OTA 111 is a range of a current that can be generated by a current source (see a current source 123 in FIG. 10 described later) included in the OTA 111. Specifically, the range of the output current is represented by Gm·ΔVin×ton/Ch using the input voltage difference ΔVin of the OTA 111, the time ton during which the switch CAL is turned on, and the charge amount Ch of the hold capacitor.

Figure 8:
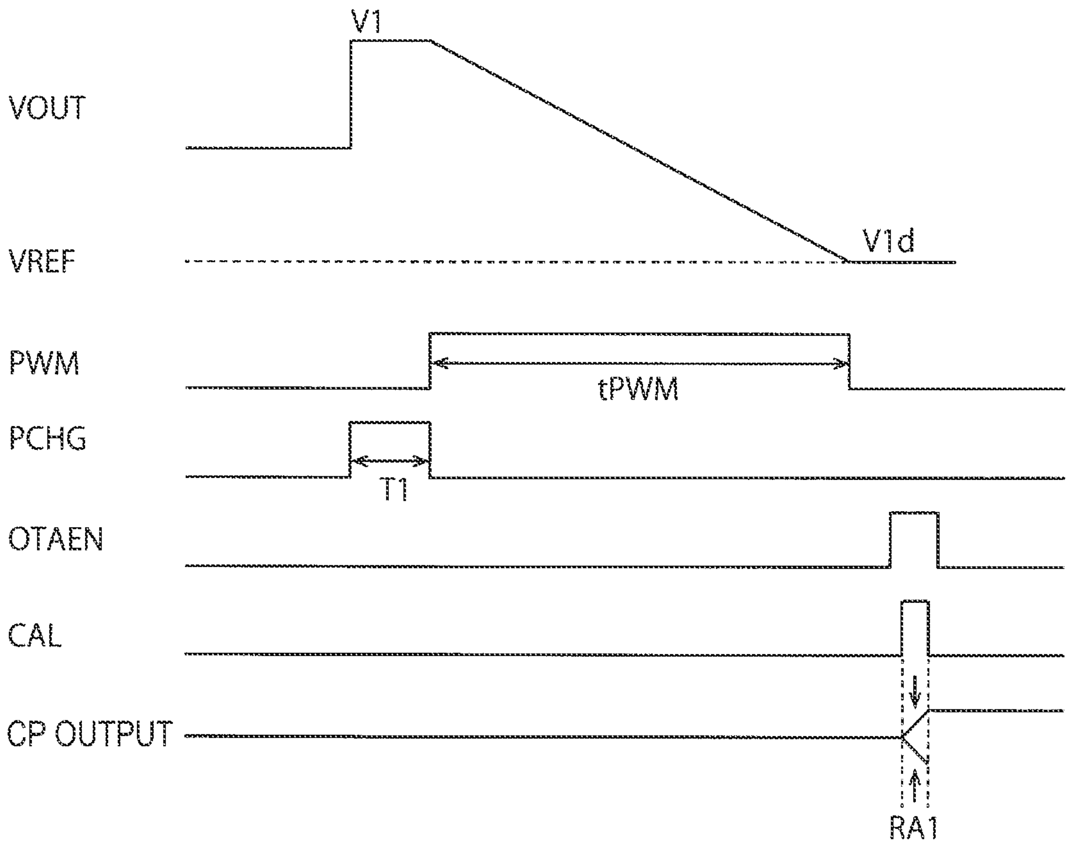
FIG. 8 is a timing chart of the drive circuit of FIG. 7.

FIG. 8 illustrates a timing chart of the drive circuit 102 of FIG. 7. The horizontal axis represents time. As an initial state, the switch PCHG, the switch PWM, and the switch CAL are all in an off state.

(1) First, the switch PCHG is turned on for a certain period T1, and the video signal line 112 is precharged using the precharge voltage VPCHG, that is, the pixel load capacitor Cpix is precharged. The voltage after the precharge is represented as V1 (=VPCHG). The voltage V1 corresponds to a voltage desired to be achieved for the minimum time width of the PWM signal. Note that the time width of the minimum PWM signal may be 0 or a time longer than 0.

(2) The switch PCHG is turned off, and the switch PWM is turned on for a time tPWM according to the PWM signal (gradation value) input from the level shifter (see FIG. 1). As a result, the video signal line 112 is charged or discharged (that is, the pixel load capacitor Cpix is charged or discharged) via the output current source IA. The current of the output current source IA is a constant current determined by Expression A described above.

(3) When the time tPWM has elapsed, the switch PWM is turned off. The output voltage Vout at this time is a voltage Vld in the example of the drawing. The OTAEN signal input to the enable terminal of the OTA 111 is turned on to make the OTA 111 in the operation state. Next, the switch CAL is turned on for a certain period of time. The OTA 111 compares the reference voltage VREF (voltage desired to be achieved) with the output voltage Vout (voltage of the pixel load capacitor Cpix) to output a current according to the voltage difference.

(4) The hold capacitor Ch is charged or discharged by the current output from the OTA 111.

(5) A charge pump (CP) output which is a voltage of the hold capacitor Ch changes. The CP output changes within a certain voltage range RA1 according to the state of charge of the hold capacitor Ch.

The operations of (1) to (5) may be repeated. As a result, the voltage of the video signal line can be adjusted to a desired voltage with high accuracy while suppressing variation between pixel columns. However, the operations (1) to (5) may be performed only once. The operations of (1) to (5) are performed, for example, in a period in which the sampling transistor of the pixel is turned off in a blanking period in which all the pixels do not emit light. After the signal voltage of the video signal line is set, the sampling transistor of the pixel is turned on for a certain period at the timing of writing into the pixel, and the signal voltage VSIG of the video signal line is written into the pixel.

The circuit that performs the analog operation of the drive circuit of FIG. 7 is only the OTA 111 and the output current source IA. The OTA 111 is required to be operated only during a period in which the gate voltage is adjusted, and the output current source IA is required to be operated only during a period in which the switch PWM is turned on. Therefore, according to the configuration of the drive circuit of FIG. 7, the DC bias power is required to be consumed only for a necessary minimum period, and it is possible to obtain the effect of reducing the power consumption.

First Specific Example

Before starting the operation in the OTA 111, the offset cancellation operation may be performed by short-circuiting between the −input terminal and the +input terminal. The offset cancellation operation is performed, for example, for a period before the CAL signal is turned on after the OTAEN signal is turned on. By performing the offset cancellation operation, it is possible to suppress variations in the operation of the OTA for each current correction circuit corresponding to the plurality of pixel columns. Therefore, the variation accuracy of the output current can be improved.

Figure 9:
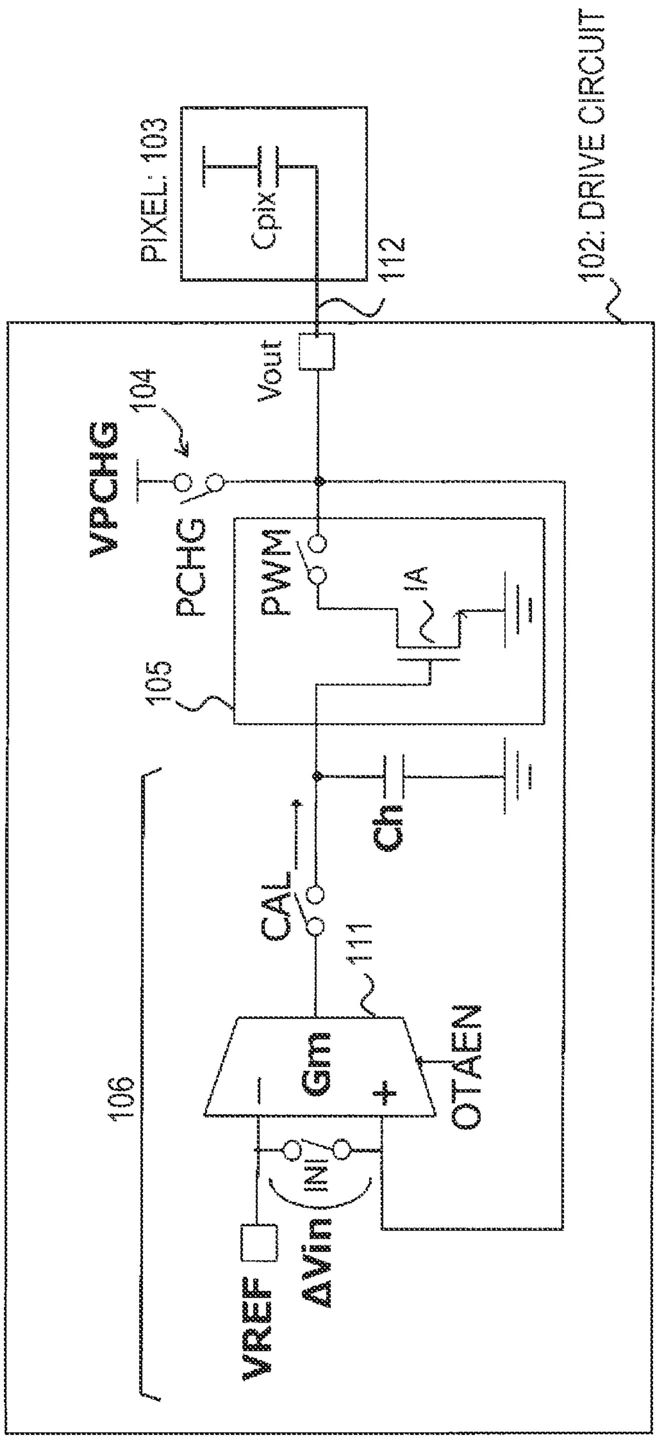
FIG. 9 is a diagram illustrating a configuration example of a drive circuit according to a first specific example.

FIG. 9 illustrates a configuration example of the drive circuit 102 according to the first specific example. A switch INI (third switch) that connects two terminals (−input terminal, +input terminal) of the OTA 111 is added.

FIGS. 10(A) and 10(B) illustrate an example of a circuit configuration of the OTA 111 in FIG. 9. A specific example of the offset cancellation operation will be described with reference to FIG. 7. FIG. 10(A) illustrates a circuit state during the offset cancellation operation, and FIG. 10(B) illustrates a circuit state during the current output operation after the offset cancellation operation.

In FIG. 10(A), the gate (+input terminal) of a PMOS transistor 121 is connected to a reference voltage terminal VREF. One end (−input terminal) of the switch CAL is connected to a VFB terminal to which the output voltage Vout (voltage of the pixel load capacitor) is input. The voltage of the VFB terminal is described as the voltage VFB.

A current source 123 is commonly connected to the source of the PMOS transistor 121 and the source of the PMOS transistor 122. The drains of the NMOS transistors 124 and 125 are connected to the drain of the PMOS transistor 121 and the drain of the PMOS transistor 122. Sources of the NMOS transistors 124 and 125 are connected to a ground voltage. The gate of the NMOS transistor 125 is connected to the ground voltage via the capacitor 126. A connection node between the drain of the PMOS transistor 122 and the drain of the NMOS transistor 125 is connected to the output terminal OTAOUT. The gate voltage of the PMOS transistor 121 is denoted by VINP, and the gate voltage of the PMOS transistor 122 is denoted by VINN.

A switch INI is provided between the other end of the switch CAL and the reference voltage VREF terminal (−input terminal). In addition, a switch 132 is provided between the capacitor 126 and the drain of the NMOS transistor 125. In the offset cancellation operation, the switches INI and 132 are turned on for a certain period of time to short-circuit between the −input terminal and the +input terminal. Further, by turning on the switch 132, the gate and the source of the NMOS transistor 125 are connected. This connection is referred to as diode connection. As a result, both the voltage VINP and the voltage VINN become the same reference voltage VREF (that is, the input potential difference is 0 V), and the output current Ical is generated.

In this state, as illustrated in FIG. 10(B), the switch INI and the switch 132 are turned off, and the switch CAL is turned on. As a result, a current (gm×(VFB−VREF)) obtained by a difference between the current according to the potential difference between the reference voltage VREF and the voltage VFB and the output current Ical (load current) is output. With such an operation, it is possible to cancel the relative variation of the OTA 111 itself. This turned offset cancellation operation is merely an example, and other offset cancellation methods can be used. By performing the offset cancellation operation in such a manner, it is possible to suppress variations in the operation of the OTA for each current correction circuit corresponding to the plurality of pixel columns. Therefore, the variation accuracy of the output current can be improved.

Figure 10:
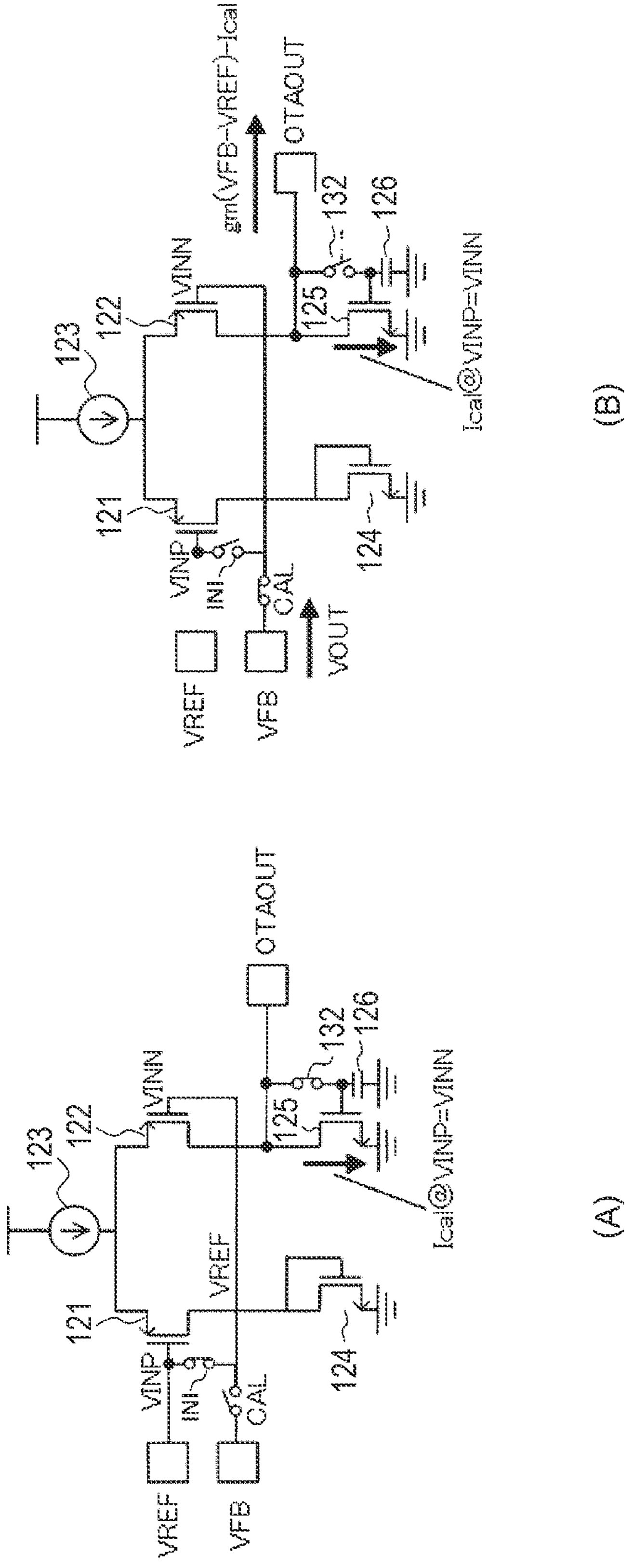
FIG. 10 is a diagram illustrating an example of a circuit configuration of an OTA in FIG. 7.
Figure 11:
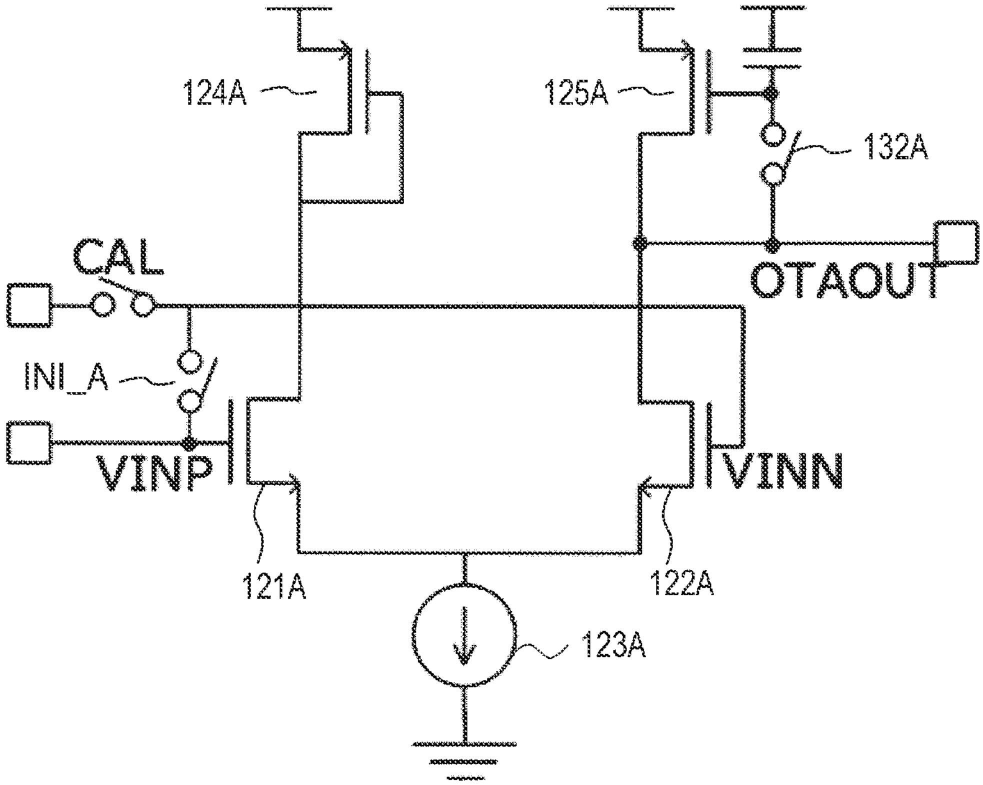
FIG. 11 is a diagram illustrating an example of a circuit configuration of an OTA in a case of N-channel driving.

FIG. 10 illustrates an example of the circuit configuration of P-channel drive, but the circuit configuration of N-channel drive is also possible. FIG. 11 illustrates an example of a circuit configuration of the OTA 111 of N-channel drive. Elements corresponding to FIG. 10 are denoted by the same reference numerals with A at the end. In the description of FIG. 11, the polarity and the like of the transistor may be appropriately read in the description of FIG. 10, and thus the detailed description will be omitted.

Second Specific Example

Figure 12:
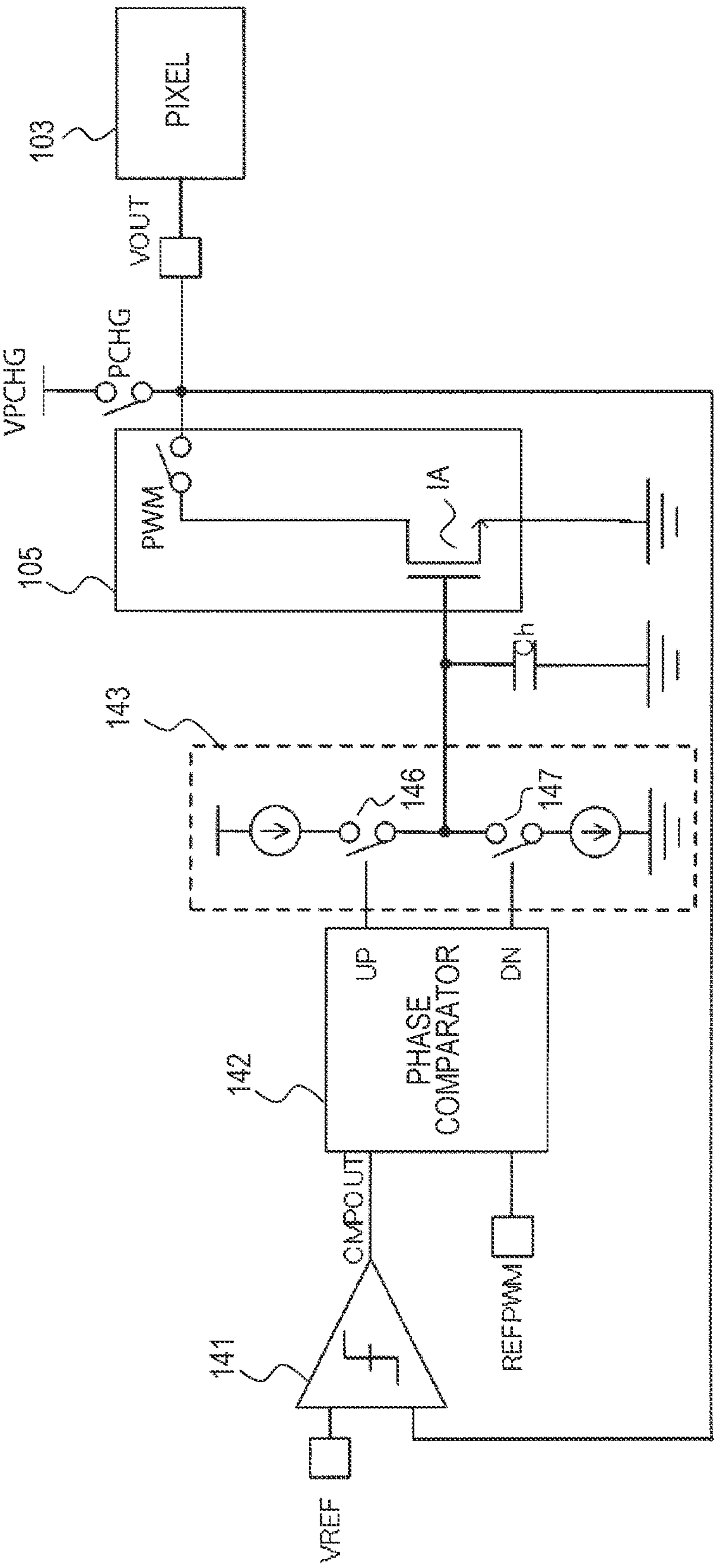
FIG. 12 is a diagram illustrating a configuration example of a drive circuit according to a second specific example.

FIG. 12 illustrates a configuration example of the drive circuit 102 according to the second specific example. In FIGS. 7 and 9, the detection circuit in the drive circuit 102 is the OTA 111, but in FIG. 12, the detection circuit includes a comparator 141, a phase comparator 142, and a charge pump 143. In FIG. 12, the pixel load capacitor is not illustrated. In the configuration of FIG. 12, it is possible to generate a current with high accuracy by the output current source IA without adding a function such as the offset cancellation operation of FIG. 9.

The comparator 141 includes two input terminals, one terminal is connected to a reference voltage VREF which is a voltage (desired voltage) desired to be set in the video signal, and the other terminal is connected to an output terminal VOUT. The comparator 141 detects timing at which the output voltage VOUT matches a reference voltage VERF. When the switch PWM is turned on according to the PWM signal and the voltage of the output terminal VOUT is input to the comparator 141, the comparator 141 detects the timing at which the input voltage matches the reference voltage VERF. A digital signal CMPOUT indicating the detected timing is output. The enable signal may be input to the comparator 141 according to the timing at which the switch PWM is turned on, and the comparator 141 may start the operation according to the input of the enable signal.

The phase comparator 142 includes two terminals, and a digital signal CMPOUT indicating the timing detected by the comparator 141 is input to one of the terminals. A digital signal REFPWM indicating the timing corresponding to the reference voltage VERF is input to the other terminal. The phase comparator 142 compares both the digital signals to detect a timing difference between the timing detected by the comparator 141 and the timing corresponding to the reference voltage VERF.

The charge pump 143 includes an upside switch 146 and a downside switch 147 connected in series. A connection node between the upside switch 146 and the downside switch 147 is connected to the hold capacitor Ch and the gate of the output current source IA (transistor). When the upside switch 146 is turned on, a current is supplied to the hold capacitor Ch. When the downside switch 147 is turned on, the current is discharged from the hold capacitor Ch.

The phase comparator 142 selectively turns on the upside switch 146 and the downside switch 147 of the charge pump 143 according to the signal of the detected timing difference. Specifically, one of the upside switch 146 and the downside switch 147 is selected according to the sign of the signal of the timing difference, and the selected switch is turned on for a time length according to the timing difference. As a result, the hold capacitor Ch is charged or discharged, and the gate voltage of the output current source IA is adjusted.

Third Specific Example

Figure 13:
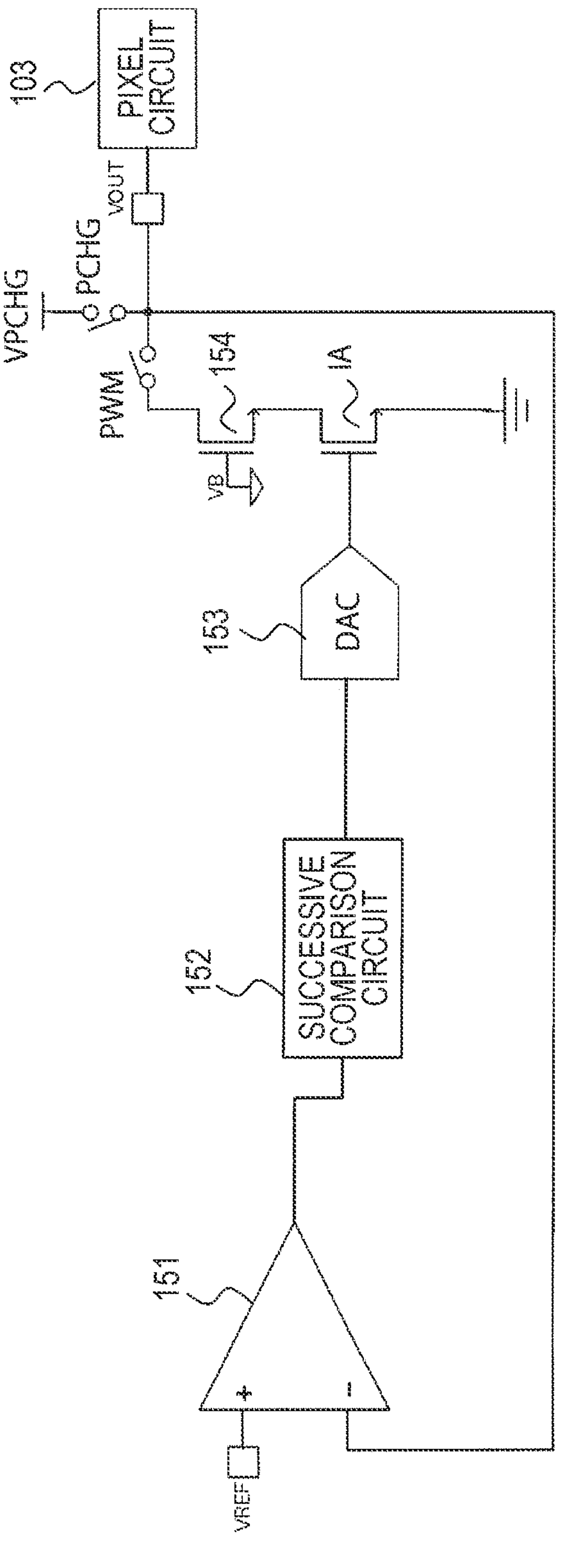
FIG. 13 is a diagram illustrating a configuration example of a drive circuit according to a third specific example.

FIG. 13 illustrates a configuration example of the drive circuit 102 according to the third specific example. In FIGS. 7 and 9, the detection circuit in the drive circuit 102 is the OTA 111, and the holding unit is the hold capacitor. In FIG. 12, the detection circuit is a differential amplifier circuit 151 and a successive comparison circuit 152, and the holding unit is a digital to analog converter (DAC) 153. An NMOS transistor 154 as a bias current source is connected to the output current source IA. The gate of the NMOS transistor 154 is connected to the bias voltage VB. In FIG. 12, the pixel load capacitor is not illustrated. In the configuration of FIG. 13, it is possible to generate a current with high accuracy by the output current source IA without adding a function such as the offset cancellation operation of FIG. 9.

The +input terminal of the differential amplifier circuit 151 is connected to a reference voltage VREF which is a voltage (desired voltage) desired to be set in the video signal. The −input terminal of the differential amplifier circuit 151 is connected to the output terminal VOUT. The differential amplifier circuit 151 compares the reference voltage VERF with the voltage of the output terminal VOUT to output a differential voltage between the both to the successive comparison circuit 152.

The successive comparison circuit 152 performs a successive comparison operation on the basis of the differential voltage input from the differential amplifier circuit 151, and calculates the differential voltage with high accuracy. That is, the comparison result in which a setting value of a gate voltage at which a desired output current flows is approached is output. The successive comparison circuit 152 outputs a digital signal according to the calculated difference voltage. The digital signal indicates a setting value of a gate voltage at which a desired output current flows or a value close thereto. The successive comparison circuit 152 outputs the digital signal to the DAC 153.

The DAC 153 converts the digital signal into a DC analog voltage. That is, the DAC 153 holds the digital signal output from the successive comparison circuit 152 to generate a voltage according to the setting value represented by the digital signal. The DAC 153 supplies the generated voltage to the gate of the output current source IA.

In the case of the circuit of FIG. 13, after the gate voltage of the output current source IA is adjusted, it is not necessary to adjust the gate voltage every frame, so that power consumption can be further reduced. In addition, since many parts of the drive circuit can be realized by the logic circuit, the size reduction effect is high in a case where the process generation advances.

A RAM, a flip-flop circuit, a latch circuit, a FIFO, or the like may be used as a circuit that holds a digital signal that is an output of the successive comparison circuit 152.

Second Embodiment

The configuration of the drive circuit of the second embodiment is the same as that of the first embodiment, but the operation on the pixel is partially different. In the second embodiment, the variation between the pixels of the threshold voltage of DrTr of the drive transistor is canceled (referred to as threshold value correction). Therefore, first, the setting of the offset voltage is set to the video signal line, and the set offset voltage is written to the pixel 103 via the sampling transistor WSTr. Threshold correction is performed on the basis of the offset voltage. After the writing of the offset voltage is completed, as in the first embodiment, the voltage for the gradation is set in the video signal line, and the signal voltage of the video signal is written in the pixel. The drive circuit of the first embodiment can also be used in a case where the offset voltage used for threshold value correction is set as described above. This makes it possible to perform threshold value correction with high accuracy while suppressing variations between pixels. Hereinafter, the second embodiment will be described in detail.

Figure 14:
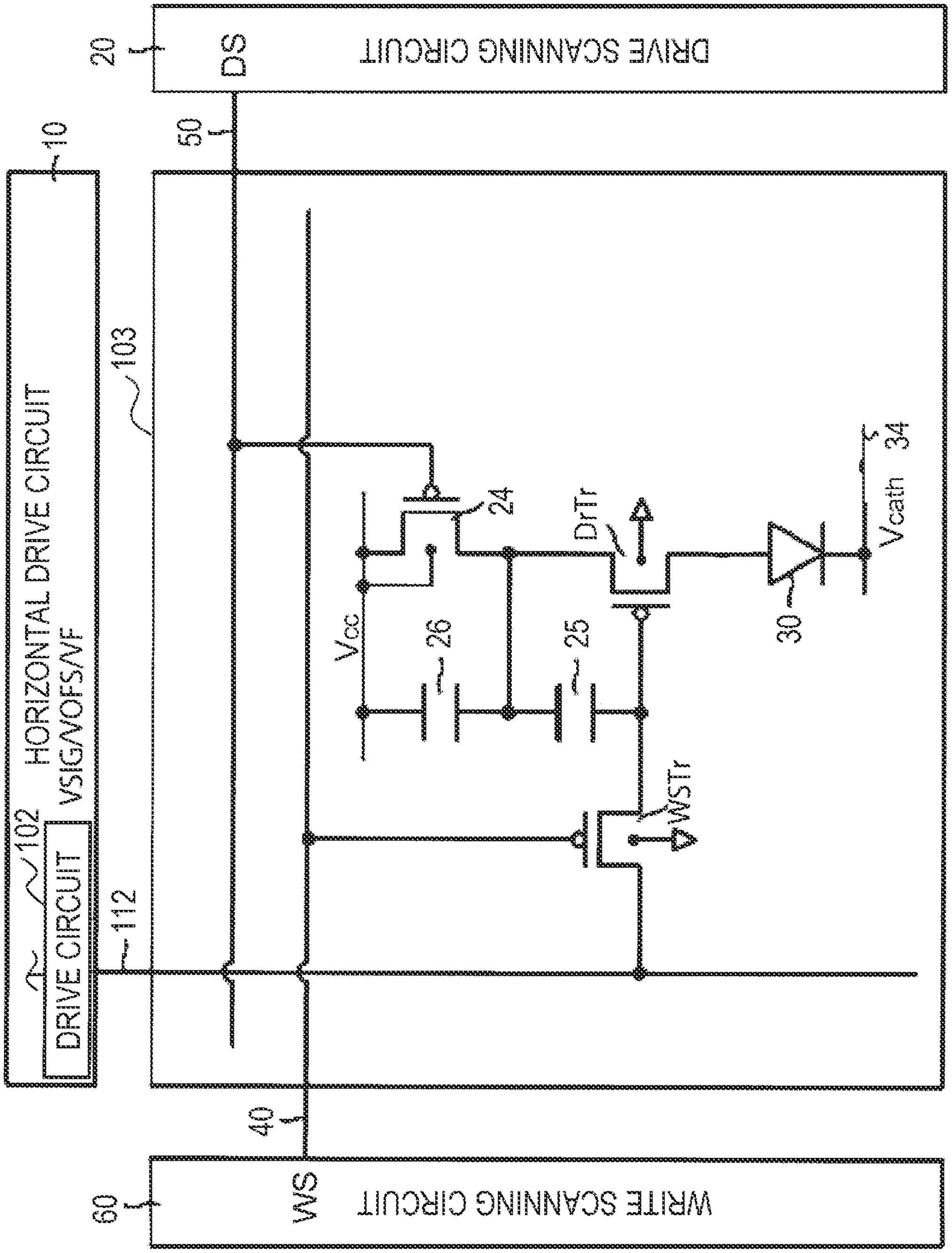
FIG. 14 is a block diagram illustrating a pixel and a peripheral circuit thereof according to a second embodiment.

FIG. 14 is a block diagram illustrating pixels and peripheral circuits thereof in an active matrix-type display device according to the second embodiment. Although one pixel 103 is illustrated in FIG. 14, pixels are actually disposed in a matrix in the pixel array. The peripheral circuit includes a horizontal drive circuit 10, a drive scanning circuit 20, and a write scanning circuit 60. The drive scanning circuit 20 and the write scanning circuit 60 correspond to a vertical drive circuit. The configuration of the pixel 103 is an example, and various other configurations can be provided. The horizontal drive circuit 10 is provided with a drive circuit 102 for each column of pixels.

The pixel 103 includes a light emitting element 30 such as an organic EL element. The cathode of the light emitting element 30 is connected to a common power supply line 34 wired in common for all the pixels. Furthermore, the pixel 103 includes a drive transistor DrTr, a sampling transistor WSTr, a light emission control transistor 24, a holding capacitor 25, and an auxiliary capacitor 26. In this example, a PMOS transistor is used for the drive transistor DrTr, the sampling transistor WSTr, and the light emission control transistor 24, but an NMOS transistor may be used, or both conductivity types may be mixed.

The sampling transistor WSTr samples the signal voltage VSIG supplied from the drive circuit 102 through the video signal line 112, and writes the signal voltage VSIG into the holding capacitor 25. The light emission control transistor 24 is connected between the power node of the power supply voltage Vcc and the source of the drive transistor DrTr, and controls light emission of the light emitting element 30 under driving by the light emission control signal DS from the drive scanning circuit 20.

The holding capacitor 25 is connected between the gate and the source of the drive transistor DrTr. The holding capacitor 25 holds the signal voltage VSIG written by sampling by the sampling transistor WSTr. The drive transistor DrTr drives the light emitting element 30 by causing a drive current according to the holding voltage of the holding capacitor 25 to flow through the light emitting element 30. The auxiliary capacitor 26 is connected between the source of the drive transistor DrTr and a node of a fixed potential, for example, a power node of the power supply voltage Vcc. The auxiliary capacitor 26 suppresses fluctuation of the source potential of the drive transistor DrTr when the signal voltage VSIG is written, and sets the gate-source voltage Vgs of the drive transistor DrTr to the threshold voltage Vth of the drive transistor DrTr. Hereinafter, the operation of the present circuit will be described.

In a state where the offset voltage VOFS is set to the video signal line 112 from the drive circuit 102, the potential WS of the scanning line 40 is caused to transition from a high potential to a low potential, and the sampling transistor WSTr is turned on. The gate potential Vg of the drive transistor DrTr is the offset voltage VOFS. At this time, the potential DS of the drive line 50 is in a low potential state, and the light emission control transistor 24 is turned on.

Therefore, the source potential Vs of the drive transistor DrTr is the power supply voltage Vcc. At this time, the gate-source voltage Vgs of the drive transistor DrTr is Vgs=VOFS−Vcc.

Here, in order to perform a threshold value correction operation (threshold value correction process) to be described later, it is necessary to make the gate-source voltage Vgs of the drive transistor DrTr larger than the threshold voltage Vth of the drive transistor DrTr. Therefore, each voltage value is set such that $$|Vgs|=|VOFS-Vcc|>|Vth|.$$

As described above, the initialization operation of setting the gate potential Vg of the drive transistor DrTr to the offset voltage VOFS and setting the source potential Vs of the drive transistor DrTr to the power supply voltage Vcc is an operation of preparation (threshold value correction preparation) before the next threshold value correction operation is performed. Therefore, the offset voltage VOFS and the power supply voltage Vcc are initialization voltages of the gate potential Vg and the source potential Vs of the drive transistor DrTr, respectively.

The potential DS of the drive line 50 is shifted from a low potential to a high potential, and the light emission control transistor 24 is turned off. The source potential Vs of the drive transistor DrTr is in floating, and the threshold value correction operation is started in a state where the gate potential Vg of the drive transistor DrTr is maintained at the offset voltage VOFS. That is, the source potential Vs of the drive transistor DrTr starts to fall (decrease) toward the potential (Vg−Vth) obtained by subtracting the threshold voltage Vth from the gate potential Vg of the drive transistor DrTr.

As described above, the operation of changing the source potential Vs of the drive transistor DrTr toward the potential (Vg−Vth) obtained by subtracting the threshold voltage Vth from the voltage VOFS with the offset voltage VOFS (initialization voltage) of the gate potential Vg of the drive transistor DrTr as a reference is the threshold value correction operation. As the threshold value correction operation proceeds, the gate-source voltage Vgs of the drive transistor DrTr converges to the threshold voltage Vth of the drive transistor DrTr. A voltage corresponding to the threshold voltage Vth is held in the holding capacitor 25.

When the potential WS of the scanning line 40 is shifted from a low potential to a high potential and the sampling transistor WSTr is turned off, the threshold value correction period ends. Thereafter, the signal voltage VSIG of the video signal is set to the video signal line 112 from the drive circuit 102. As a result, the potential of the video signal line 112 is switched from the offset voltage VOFS to the signal voltage VSIG.

The potential WS of the scanning line 40 is shifted from a high potential to a low potential, the sampling transistor WSTr is turned off, and the signal voltage VSIG is sampled and written in the pixel 103. By the operation of writing the signal voltage VSIG by the sampling transistor WSTr, the gate potential Vg of the drive transistor DrTr is the signal voltage VSIG.

When the signal voltage VSIG of the video signal is written, the auxiliary capacitor 26 connected between the source of the drive transistor DrTr and the power node of the power supply voltage Vcc suppresses fluctuation of the source potential Vs of the drive transistor DrTr. Then, when the drive transistor DrTr is driven by the signal voltage VSIG of the video signal, the threshold voltage Vth of the drive transistor DrTr is canceled out by the voltage corresponding to the threshold voltage Vth held in the holding capacitor 25.

The potential WS of the scanning line 40 is shifted from a low potential to a high potential, and the sampling transistor WSTr is turned off, whereby the signal writing is terminated. The potential DS of the drive line 50 is shifted from a high potential to a low potential, and the light emission control transistor 24 is turned on. As a result, a current is supplied from the power node of the power supply voltage Vcc to the drive transistor DrTr through the light emission control transistor 24.

At this time, since the holding capacitor 25 is connected between the gate and the source of the drive transistor DrTr, the gate potential Vg also fluctuates in conjunction with the fluctuation of the source potential Vs of the drive transistor DrTr. That is, the source potential Vs and the gate potential Vg of the drive transistor DrTr increase while holding the gate-source voltage Vgs held in the holding capacitor 25. Then, the source potential Vs of the drive transistor DrTr rises to the light emission voltage of the light emitting element 30 according to the saturation current of the transistor. When the drain-source current of the drive transistor DrTr starts flowing through the light emitting element 30, the anode potential of the light emitting element 30 increases. Eventually, when the anode potential of the light emitting element 30 exceeds the threshold voltage of the light emitting element 30, a drive current starts to flow through the light emitting element 30, so that the light emitting element 30 starts light emission.

Each operation of the threshold value correction preparation, the threshold value correction, and the writing (signal writing) of the signal voltage VSIG described above is executed, for example, in one horizontal period (1H).

Hereinafter, an operation of the drive circuit 102 according to the second embodiment in a circuit that performs a threshold value correction by writing an offset voltage before writing a signal voltage as illustrated in FIG. 14 will be described with reference to FIG. 15.

Figure 15:
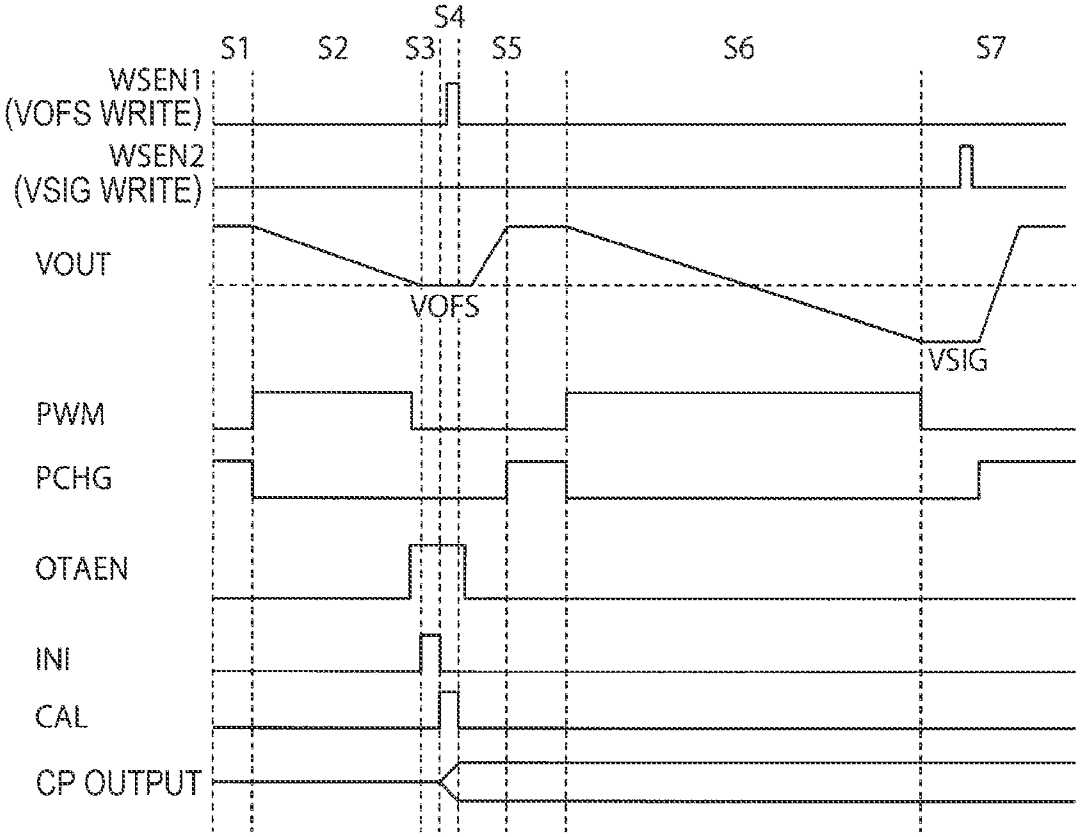
FIG. 15 is a timing chart of a drive circuit according to the second embodiment.

FIG. 15 is a timing chart of the drive circuit 102 according to the second embodiment. Here, it is assumed that the drive circuit 102 includes the OTA 111 having the offset cancellation function of FIG. 9. The horizontal axis represents time. For the sake of explanation, the time axis is divided into a plurality of sections S1 to S7.

First, in the section S1, the PCHG switch is turned on, and the video signal line 112 (pixel load capacitor) is precharged to a predetermined voltage PCHG (the output terminal VOUT has a precharge voltage).

In the section S2, the switch PCHG is turned off, and the switch PWM is turned on for a predetermined time according to the VOSF. At this time, the offset voltage VOFS is provided as the reference voltage REF of the OTA 111. When the precharged video signal line 112 (pixel load capacitor) is discharged with a constant inclination and a predetermined time elapses, the switch PWM is turned off. At this time, the voltage of the output terminal VOUT is the VOSF or a voltage close thereto. When the PWM switch is turned off, the enable signal OTAEN of the OTA 111 is turned on.

While the OTA 111 is turned on, the switch INT is turned on in the section S3, and offset cancellation is performed.

Next, in the section S4, the CAL switch is turned on, and a current is output from the OTA 111. In addition, the sampling transistor in the pixel is turned on (the WSEN1 signal is turned on), and the offset voltage VOSF is supplied to the pixel. In the pixel, the above-described threshold value correction is performed on the basis of the offset voltage VOSF.

In the section S5, the operation of the OTA 111 is stopped. The voltage of the hold capacitor Ch is applied to the gate of the output current source IA, and the gate voltage (CP output) fluctuates accordingly. After the OTA 111 is turned off, the switch PCHG is turned on, and the video signal line 112 (pixel load capacitor) is precharged again. The output terminal VOUT is set to the precharge voltage.

In the section S6, the switch PCHG is turned on for a time according to the PWM signal supplied from the level shifter (a time according to a desired gradation). When the pre-charged video signal line 112 (pixel load capacitor) is discharged with a constant inclination and a time according to the PWM signal elapses, the switch PWM is turned off. The voltage of the output terminal VOUT at this time is the signal voltage VSIG for writing.

In the section S7, the sampling transistor in the pixel is turned on (the WSEN2 signal is turned on), and the signal voltage VSIG is written to the pixel via the sampling transistor.

Thereafter, the operations S1 to S7 may be repeated one or more times. Alternatively, the repetition may not be performed. The operations from S1 to S7 may be performed one or more times during the blanking period.

Third Embodiment

In the third embodiment, a case where the pixels are red (R), blue (G), and green (B) subpixels will be described. The gate voltage of the output current source IA is adjusted such that a current (reference current) having a constant gradient is obtained by discharging the dummy capacitor for a certain period of time using a capacitor (dummy capacitor) different from the pixel load capacitor using the drive circuit of the first embodiment. Then, the reference current is copied to the sub-drive circuit for each of the red (R), blue (G), and green (B) subpixels by the current sampling operation. In the sub-drive circuit, using a current copied from the drive circuit, charging or discharging is performed on a video signal line pre-charged for each sub-drive circuit during a time period according to the PWM signal. As a result, a signal voltage according to the gradation is set to each of the RGB video signal lines.

Figure 16:
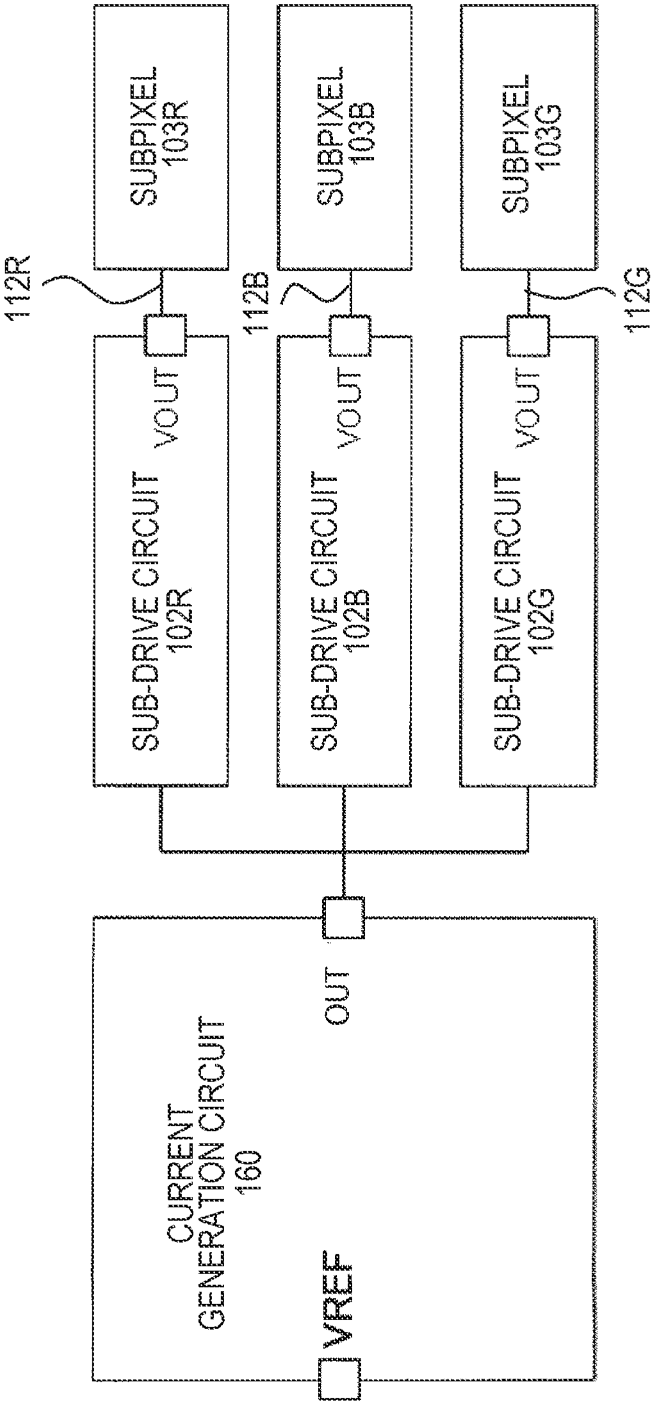
FIG. 16 is a block diagram of a drive circuit according to a third embodiment.

FIG. 16 is a block diagram of a drive circuit according to a third embodiment. The drive circuit of FIG. 16 includes a current generation circuit 160 and three sub-drive circuits 102R, 102B, and 102G corresponding to red (R), blue (B), and green (G), respectively. The output terminals VOUT of the three sub-drive circuits 102R, 102B, and 102G are connected to the subpixels 103R, 103B, and 103G via video signal lines 112R, 112B, and 112G for RBG, respectively. The current generation circuit 160 is connected to the sub-drive circuits 102R, 102B, and 102G via the output terminal OUT. The current generation circuit 160 has a VERF terminal to which a predetermined reference voltage VER is input.

Figure 17:
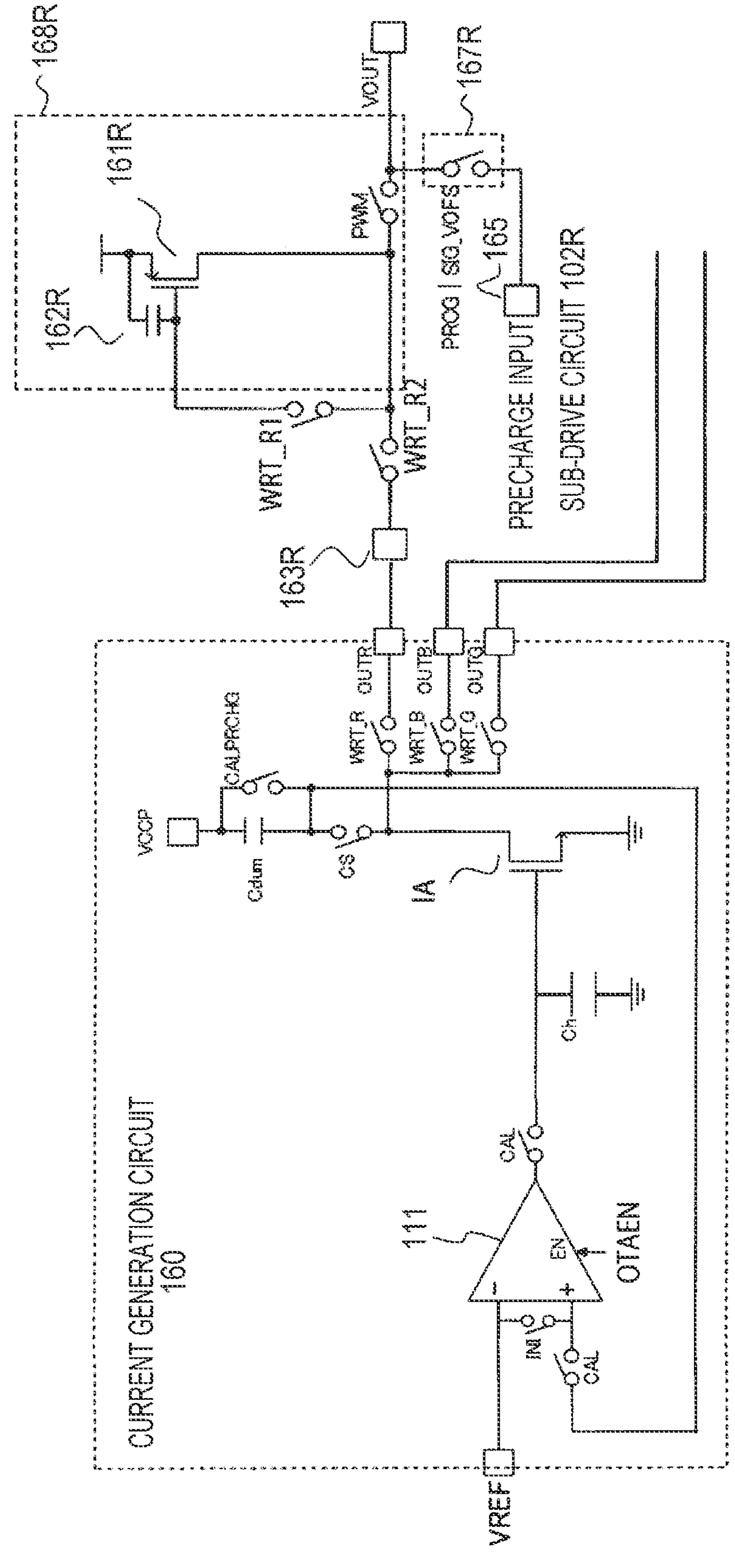
FIG. 17 is a diagram illustrating a configuration example of a current generation circuit and a sub-drive circuit.

FIG. 17 illustrates a configuration example of the current generation circuit 160 and the sub-drive circuit 102R. The configuration of each of the sub-drive circuits 102B and 102G is the same as that of the sub-drive circuit 102R, and is not illustrated.

The current generation circuit 160 includes an input terminal VCCP, a dummy capacitor Cdum, a switch CS (fourth switch), a switch CALPRCHG (fifth switch), switches WRT_R, WRT_B, and WRT_G (seventh switch), and output terminals OUTR, OUTB, and ORTG. Furthermore, the current generation circuit 160 includes an output current source IA, a hold capacitor Ch, an OTA 111, two switches CAL, and a switch INI. Note that although the switch CAL is connected to the −input terminal of the OTA 111, the switch CAL may be omitted and only the switch CAL on the output side of the OTA 111 may be provided. In the configuration of FIG. 9 described above, a switch CAL may be additionally connected to the −input terminal of the OTA 111 to provide two CAL switches. Since operations of the output current source IA, the hold capacitor Ch, the OTA 111, the two switches CAL, and the switch INI are similar to those in FIG. 9 of the first embodiment, detailed description thereof will be omitted.

The sub-drive circuit 102R includes a switch WRT_R1 (sixth switch), a switch WRT_R2, a PMOS transistor 161R (third transistor), a capacitor 162R, a switch PWM, a switch PRCG|SIG_VOFS, a precharge input terminal 165, and an output terminal VOUT. The switch PRCG|SIG_VOFS corresponds to a setting circuit 167R configured to precharge the video signal line 112R connected to the output terminal VOUT on the basis of the voltage applied to the precharge input terminal 165. The transistor 161R, the capacitor 162R, and the switch PWM correspond to an adjustment circuit 168R configured to adjust the voltage of video signal line 112R by charging or discharging the precharged video signal line 112R during a time period according to the PWM signal.

In the current generation circuit 160, for example, VG0 (voltage corresponding to the minimum gradation) is applied to the input terminal VCCP, and VG255 (voltage corresponding to the maximum gradation) is applied to the VERF terminal as the reference voltage VERF. The OTA 111 and the hold capacitor Ch are used to generate, as a reference current, a current having a slope that reaches from a voltage corresponding to the minimum gradation to a voltage corresponding to the maximum gradation in a certain time (corresponding to a PWM signal having the maximum width). This reference current is copied to the sub-drive circuits 102R, 102B, and 102G by current sampling. The sub-drive circuits 102R, 102B, 102G charge or discharge the precharged video signal lines 112R, 112B, 112G using the copied reference current during a time period according to the PWM signal. Consequently, a voltage according to the gradation is set to each of the RGB video signal lines. As in the second embodiment, before setting the video signal, the offset voltage may be set in the video signal line, and the threshold value correction based on the offset voltage may be performed in each subpixel. In the following description of the operation, a case where threshold value correction is performed will be described.

Figure 18:
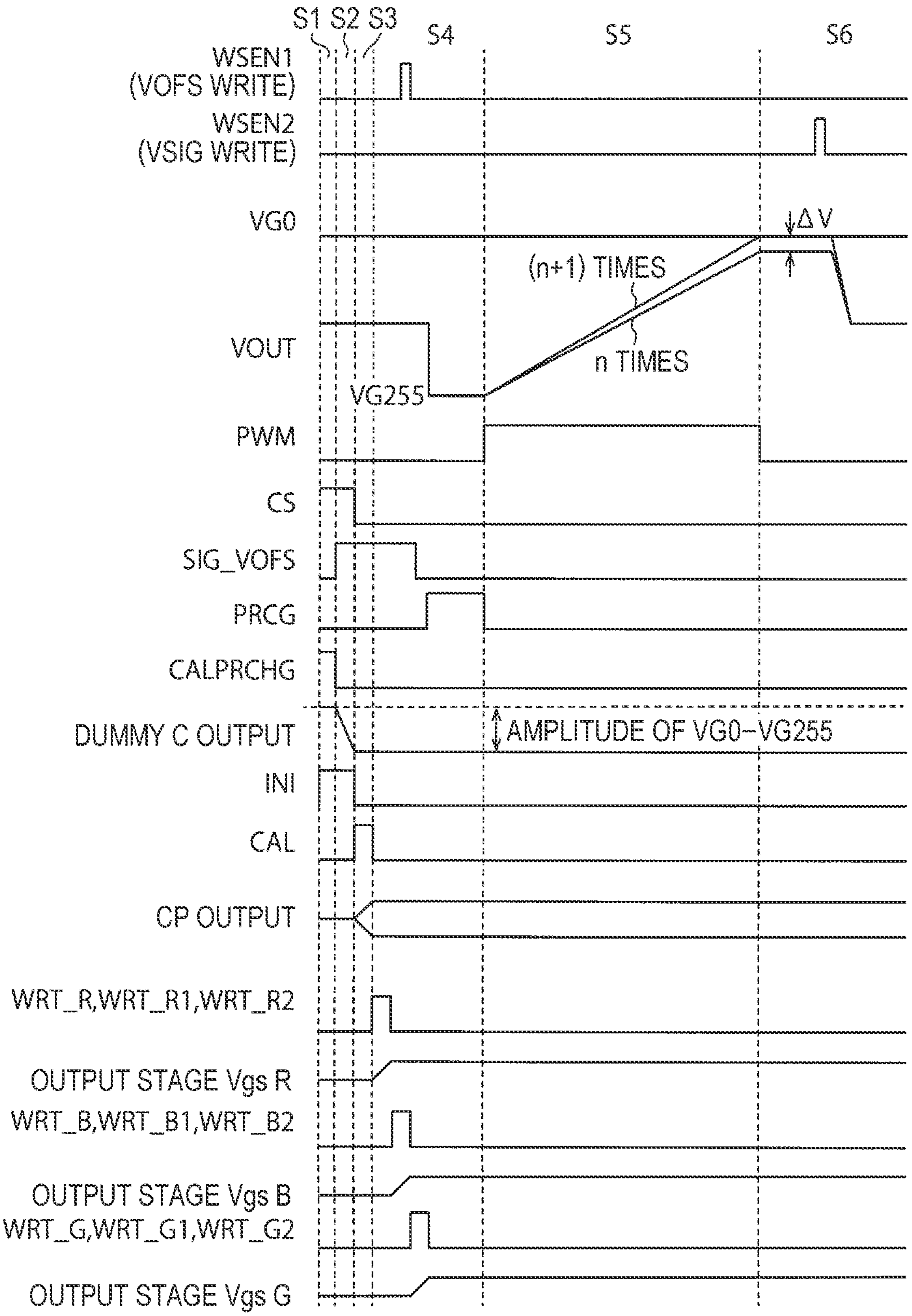
FIG. 18 is a timing chart of the drive circuit of FIG. 17.

FIG. 18 is a timing chart of the drive circuit of FIG. 17. The horizontal axis represents time. In this example, a case where the voltages (VG0) corresponding to the minimum gradation are set in the video signal line by the sub-drive circuits 102R, 102B, and 102G, that is, a case where the voltages of the output terminals VOUT of the sub-drive circuit are set to VG0 is assumed.

In the sections S1 to S4, generation of the reference current serving as the copy source (setting of the dummy capacitor Cdum) in the current generation circuit 160, and setting of the offset voltage for each subpixel and threshold value correction are performed in parallel. Specifically, first, in the section S1, the switch CS and the switch CALPRCHG are turned on to precharge the Cdum to VG0. In addition, the switch INI on the input side of the OTA 111 is turned on to cancel the offset.

In the section S2, the switch CALPRCHG is turned off, and the dummy capacitor Cdum is discharged for a certain period of time. The voltage amplitude of the dummy capacitor Cdum is a value obtained by subtracting VG255 from VG0 by discharging. A current (reference current) with a constant slope that reaches from a voltage corresponding to the minimum gradation to a voltage corresponding to the maximum gradation or a voltage close thereto in a certain period of time (corresponding to a PWM signal with the maximum width) flows.

In the section S3, the switch CS is turned off, the two CAL switches are turned on, and the OTA 111 is operated. Note that, although not illustrated, the enable signal OTAEN turned on is also input to the OTA 111. The output voltage of the dummy capacitor Cdum is compared with the VREF voltage (VG255), the hold capacitor Ch is charged or discharged, and the gate voltage (CP output in the drawing) of the output current source IA is adjusted. As a result, variations in the current sources IA between the pixels are adjusted.

In the section S4, the two CAL switches are turned off, and the operation of the OTA 111 is terminated. The switch WRT_R in the current generation circuit 160 and the two switches WRT_R1 and WRT_R2 in the sub-drive circuit 102R are turned on, and the current (reference current) generated by the current generation circuit 160 is copied to the sub-drive circuit 102R. That is, by turning on the switch WRT_R in the current generation circuit 160 and the two switches WRT_R1 and WRT_R2 in the sub-drive circuit 102R, the gate and the drain of the PMOS transistor 161R are electrically connected to the output terminal OUTR of the current generation circuit 160. The source of the PMOS transistor 161R is connected to a voltage of VG0, and the PMOS transistor 161 is diode-connected. The current is generated as a current flowing through the source and the drain of the PMOS transistor 161 and flowing through the output current source IA, as a current having the same gradient as the reference current. In this state, the switch WRT_R in the current generation circuit 160 and the two switches WRT_R1 and WRT_R2 in the sub-drive circuit 102R are turned off. The gate-source capacitor 162R holds a gate-source voltage (output stage VgsR in the drawing) necessary for generating a current having the same slope as the reference current.

Similarly, the switch WRT_B in the current generation circuit 160 and the two switches WRT_B1 and WRT_B2 in the sub-drive circuit 102B are turned on, and the reference current generated by the current generation circuit 160 is copied to the sub-drive circuit 102B. In addition, the switch WRT_G in the current generation circuit 160 and the two switches WRT_G1 and WRT_G2 in the sub-drive circuit 102G are turned on, and the reference current generated by the current generation circuit 160 is copied to the sub-drive circuit 102G.

In parallel with the operations in the sections S1 to S4 described above, in each sub-drive circuit, an offset voltage is set for each video signal line, and threshold value correction based on the set offset voltage is performed in each subpixel. Specifically, in the middle of the section S2 to the section S4, the switch SIG_VOFS in each sub-drive circuit is turned on in a state where the precharge input terminal 165 is connected to the offset voltage VOFS. As a result, the video signal lines 112R, 112B, and 112G are precharged to the offset voltage VOFS. In a state in which the video signal lines 112R, 112B, and 112G are precharged, the sampling transistor included in each subpixel is turned on (the WSEN1 signal is turned on), and the offset voltage VOFS is written to each subpixel. In each subpixel, a threshold value correction operation is performed using the offset voltage VOFS.

When setting and writing of the offset voltage VOFS for each sub-drive circuit are completed and copying of the reference current is completed, the switch PRCG in each sub-drive circuit is turned on for a certain period of time, and the video signal lines 112R, 112B, and 112G are precharged to the VG255. That is, the voltage of the video signal lines 112R, 112B, and 112G change from VOFS to VG255. Note that the switch PRCG is the same switch as the switch SIG_VOFS, but since the purpose of switching is different, the same switch is denoted by a different reference sign for convenience.

In the section S5, when the switch PRCG in each sub-drive circuit is turned off, the switch PWM in each sub-drive circuit is turned on for a time length according to the PWM signal. In the figure, only the PWM signal of one of the three subpixels (here, a subpixel 103R) is illustrated. In this example, the PWM signal of the maximum time length corresponding to the minimum gradation is illustrated. While the switch PWM is turned on, a current according to the gate-source voltage held in the capacitor 162R, that is, a current having the same gradient as the reference current, is supplied from the transistor 161R to the video signal line via the switch PWM (current sampling). As a result, the video signal line precharged to the VG255 is charged or discharged (charged in the example of the drawing). By charging the video signal line, the voltage of the video signal line (the voltage of the pixel load capacitor) is set to or brought close to the voltage VG0 corresponding to the minimum gradation.

When the switch PWM is turned off in the section S6, the sampling transistor of each subpixel is turned on (the WSEN2 signal is turned on), and the voltage VSIG of the video signal line is written to each subpixel. In each subpixel, a light emitting element is driven according to the voltage VSIG, and light is emitted at a gradation corresponding to the signal voltage VSIG. The sections S1 to S5 may be repeated one or more times before the signal voltage is written (before the sampling transistor is turned on). As a result, the gate voltage of the output current source IA of the current generation circuit 160 is adjusted with high accuracy, and the voltage VSIG can be set to a target voltage (VG0 in the example of the drawing) with high accuracy. In the drawing, it is schematically illustrated that the voltage can be brought close to the voltage VG0 by increasing the number of operations from n times to (n+1) times.

According to the configurations of FIGS. 16 and 17, it is not necessary to provide the drive circuit as in the first embodiment for each subpixel, and the current generation circuit can be shared by the plurality of sub-drive circuits, so that the circuit area can be reduced. In addition, since the DC bias power (VERF voltage) is only required to be supplied by one current generation circuit only at the time of adjustment of the output current source IA, the power consumption can be reduced.

Note that the above-described embodiments illustrate an example for embodying the present disclosure, and the present disclosure can be implemented in various other forms. For example, various modifications, substitutions, omissions, or combinations thereof can be made without departing from the gist of the present disclosure. Embodiments in which such modifications, substitutions, omissions, and the like are made are also included in the scope of the present disclosure, and are included in the invention described in the claims and equivalents thereof.

Furthermore, the effects of the present disclosure described in the present specification are merely examples, and other effects may be provided.

Note that the present disclosure can also have the following configurations.

[Item 1]

A drive circuit including a setting circuit configured to precharge, to a first voltage, a video signal line connected to a first transistor configured to sample a voltage of the video signal line, and an adjustment circuit configured to adjust a voltage of the video signal line by charging or discharging the video signal line precharged to the first voltage during a time period corresponding to a second voltage set in the video signal line.

[Item 2]

The drive circuit according to item 1, in which the setting circuit includes a first switch that connects the video signal line to the first voltage, and the adjustment circuit includes a current source that includes a second transistor and a second switch that connects the video signal line and the current source.

[Item 3]

The drive circuit according to item 2, further including a detection circuit that includes a first terminal connected to the second voltage and a second terminal connected to the video signal line, and is configured to detect a difference between the second voltage and a voltage of the video signal line, and a holding circuit configured to hold a voltage according to the difference and supply the voltage to a control terminal of the current source.

[Item 4]

The drive circuit according to item 3, in which the detection circuit includes an amplifier configured to generate a current according to a difference between the second voltage and a voltage of the video signal line, and the holding circuit includes a capacitor configured to accumulate a charge according to the current.

[Item 5]

The drive circuit according to item 4, further including a third switch that connects the first terminal and the second terminal, in which the adjustment circuit turns on the third switch for a certain period before an operation of the amplifier.

[Item 6]

The drive circuit according to item 3, in which the detection circuit includes a comparator configured to detect timing at which a voltage of the video signal line is the second voltage, a phase comparator configured to detect a difference between the timing and timing according to the second voltage, and a charge pump configured to generate a current according to the difference, and the holding circuit includes a capacitor configured to accumulate a charge according to the current.

[Item 7]

The drive circuit according to item 3, in which the detection circuit includes a conversion circuit configured to convert the difference between the second voltage and a voltage of the video signal line into a digital signal, and the holding circuit includes a digital to analog converter configured to supply a voltage according to the digital signal to the control terminal.

[Item 8]

The drive circuit according to any one of items 1 to 7, in which the first voltage includes a voltage corresponding to a maximum gradation or a minimum gradation.

[Item 9]

The drive circuit according to any one of items 1 to 8, in which the second voltage includes a voltage corresponding to a gradation that a pixel circuit including the first transistor is caused to display.

[Item 10]

The drive circuit according to any one of items 1 to 9, in which the second voltage includes an offset voltage for correcting a threshold voltage of a second transistor for driving a light emitting element in a pixel circuit including the first transistor.

[Item 11]

The drive circuit according to item 10, further including a scanning circuit configured to turn on the first transistor and supply a voltage of the video signal line set to the offset voltage to a node in the pixel circuit, in which the setting circuit precharges the video signal line to the first voltage after the offset voltage is supplied to the pixel circuit, the adjustment circuit adjusts the video signal line to a voltage corresponding to a gradation by charging or discharging the video signal line precharged to the first voltage during a time period according to the voltage corresponding to the gradation, and the scanning circuit turns on the first transistor to supply a voltage of the video signal line to a node in the pixel circuit.

[Item 12]

The drive circuit according to any one of item 1 to 11, further including a plurality of sub-drive circuits each including the setting circuit and the adjustment circuit, and a current generation circuit configured to generate a reference current, in which the plurality of sub-drive circuits is connected to a plurality of the video signal lines, the adjustment circuit of each of the plurality of sub-drive circuits includes a third transistor configured to sample a reference current, and the adjustment circuit of each of the plurality of sub-drive circuits charges or discharges the video signal line precharged by the setting circuit with a current sampled by the third transistor.

[Item 13]

The drive circuit according to item 12, in which the current generation circuit includes a first capacitor connected to a third voltage, a current source that includes a fourth transistor, a fourth switch that connects the first capacitor and the current source, a fifth switch connecting both ends of the first capacitor, a detection circuit that includes a first terminal connected to a fourth voltage and a second terminal connected to the fourth switch, the detection circuit being configured to detect a difference between a voltage of the first terminal and a voltage of the second terminal, a holding circuit configured to hold a voltage according to the difference and supply the voltage to a control terminal of the current source, a sixth switch that diode-connects the third transistor of each of the plurality of sub-drive circuits, and a seventh switch that connects the diode-connected third transistor of each of the plurality of sub-drive circuits and the current source.

[Item 14]

The drive circuit according to item 13, in which the fourth switch and the fifth switch are turned on to precharge the first capacitor, the fifth switch is turned off to discharge the first capacitor to generate the reference current, the fourth switch is turned off to operate the detection circuit for a certain period, and the sixth switch and the seventh switch are turned on to sample the reference current in the sub-drive circuit.

[Item 15]

The drive circuit according to any one of items 1 to 14, in which during a period during which the first transistor is turned off, the setting circuit precharges the video signal line to the first voltage and the adjustment circuit adjusts the video signal line to the second voltage.

[Item 16]

The drive circuit according to item 15, in which a period during which the first transistor is turned off includes a blanking period that includes a period during which a pixel circuit including the first transistor does not emit light.

[Item 17]

A display device including a video signal line configured to supply a video signal, a pixel circuit including a first transistor connected to the video signal line, the first transistor being configured to sample a voltage of the video signal line, a drive circuit including a setting circuit configured to precharge the video signal line to a first voltage and an adjustment circuit configured to adjust a voltage of the video signal line by charging or discharging the video signal line precharged to the first voltage during a time period corresponding to a second voltage set in the video signal line, and a scanning circuit configured to control on and off of the first transistor.

[Item 18]

A drive method including precharging, to a first voltage, a video signal line connected to a first transistor configured to sample a voltage of the video signal line, and adjusting a voltage of the video signal line by charging or discharging the video signal line precharged to the first voltage during a time period corresponding to a second voltage set in the video signal line.

REFERENCE SIGNS LIST

10 Horizontal drive circuit
20 Drive scanning circuit
24 Light emission control transistor
26 Auxiliary capacitor
25 Holding capacitor
30 Light emitting element
34 Common power supply line
60 Write scanning circuit
101 Current drive circuit
102 Drive circuit
104 Setting circuit
103 Pixel circuit (pixel)
105 Adjustment circuit
103R, 103B, 103G Subpixel
111 Voltage control current source circuit (OTA)
112 Video signal line
121, 122, 124, 125 Transistor
123 Current source
126 Capacitor
132 Switch
142 Phase comparator
143 Charge pump
146 Upside switch
147 Downside switch
151 Differential amplifier circuit
152 Successive comparison circuit
153 DAC
154 Transistor
160 Current generation circuit
102R, 102B, 102G Sub-drive circuit
103R, 103B, 103G Subpixel
161R Transistor
162R Capacitor
1100 Shift register
1101 First latch circuit
1102 Second latch circuit
1104 Synchronization counter
1103 Digital comparator
1105 PWM generation circuit
1106 Level shifter
Vout Output terminal, Output voltage
VREF Reference terminal, Reference voltage
IA Output current source
WSTr Sampling transistor
DrTr Drive transistor
Cs Capacitor
Ch Hold capacitor
Cdum Dummy capacitor
PWM, PCHG, CAL, INI, CS, CALPRCHG, WRT_R, WRT_B, WRT_G, WRT_R1, WRT_B1, WRT_G1, WRT_R2, WRT_B2, WRT_G2, PROG,
SIG_VOFS Switch

The invention claimed is:

1. A drive circuit comprising:

a setting circuit that includes a first switch configured to connect, to a first voltage line, a video signal line connected to at least one pixel circuit that includes a light emitting element, and is configured to precharge the video signal line to a first voltage supplied from the first voltage line;

an adjustment circuit that includes a current source and a second switch configured to electrically connect the video signal line to the current source during a period according to a video signal, and is configured to adjust a voltage of the video signal line by charging or discharging the video signal line precharged to the first voltage with a current generated by the current source; and a detection circuit that includes a first terminal connected to a second voltage line and a second terminal connected to the video signal line, and is configured to detect a difference between a second voltage supplied from the second voltage line and a voltage of the video signal line, wherein the current source is configured to generate the current in accordance with the difference.

2. The drive circuit according to claim 1, further comprising: a controller configured to supply a control voltage in accordance with the difference to a control terminal of the current source.

3. The drive circuit according to claim 2, wherein the controller is configured to store the control voltage and supply the voltage to the control terminal of the current source.

4. The drive circuit according to claim 1, wherein the detection circuit includes an amplifier configured to generate a control current in accordance with the difference, and the controller includes a capacitor configured to store a control voltage according to the control current.

5. The drive circuit according to claim 4, further comprising:

a third switch that connects the first terminal and the second terminal, wherein the adjustment circuit is configured to turn on the third switch for a time period before an operation of the amplifier.

6. The drive circuit according to claim 1, wherein the detection circuit includes a comparator configured to detect timing at which a voltage of the video signal line is the second voltage, and a phase comparator configured to detect a difference between the timing and timing according to the second voltage, and further comprising a charge pump configured to generate a control current according to the difference, and a controller that includes a capacitor configured to store a control voltage according to the control current and is configured to supply the control voltage to a control terminal of the current source.

7. The drive circuit according to claim 1, wherein the detection circuit includes a conversion circuit configured to convert the difference between the second voltage and a voltage of the video signal line into a digital signal and a digital to analog converter configured to supply a voltage according to the digital signal to a control terminal of the current source.

8. The drive circuit according to claim 1, wherein the first voltage includes a voltage corresponding to a maximum gradation or a minimum gradation.

9. The drive circuit according to claim 1, wherein the second voltage includes a voltage corresponding to a gradation that the pixel circuit is caused to display.

10. The drive circuit according to claim 1, wherein the second voltage includes an offset voltage for correcting a threshold voltage of a drive transistor for driving a light emitting element in the pixel circuit.

11. The drive circuit according to claim 10, further comprising:

a scanning circuit configured to turn on a sampling transistor included in the pixel circuit and supply a voltage of the video signal line set to the offset voltage to a node in the pixel circuit, wherein the setting circuit is configured to precharge the video signal line to the first voltage after the offset voltage is supplied to the pixel circuit, the adjustment circuit is configured to adjust the voltage of the video signal line to a voltage corresponding to a gradation by charging or discharging the video signal line precharged to the first voltage during a time period according to the voltage corresponding to the gradation, and the scanning circuit is configured to turn on the sampling transistor to supply the voltage of the video signal line to the node in the pixel circuit.

* * * * *